US011528137B2

(12) United States Patent
Lee et al.

(10) Patent No.: US 11,528,137 B2
(45) Date of Patent: Dec. 13, 2022

(54) IDENTITY-BASED ENCRYPTION OF A MESSAGE ASSOCIATED WITH A CONNECTION PROCEDURE

(71) Applicant: QUALCOMM Incorporated, San Diego, CA (US)

(72) Inventors: Soo Bum Lee, San Diego, CA (US); Adrian Edward Escott, Reading (GB); Gavin Bernard Horn, La Jolla, CA (US); Anand Palanigounder, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 331 days.

(21) Appl. No.: 16/669,426

(22) Filed: Oct. 30, 2019

(65) Prior Publication Data

US 2020/0145211 A1 May 7, 2020

Related U.S. Application Data

(60) Provisional application No. 62/754,424, filed on Nov. 1, 2018.

(51) Int. Cl.
*H04L 9/30* (2006.01)
*H04L 29/06* (2006.01)
(Continued)

(52) U.S. Cl.
CPC .............. *H04L 9/3073* (2013.01); *H04L 9/08* (2013.01); *H04W 8/02* (2013.01); *H04W 12/02* (2013.01);
(Continued)

(58) Field of Classification Search
CPC ..... H04L 9/3073; H04L 9/08; H04L 2209/80; H04W 8/02; H04W 12/02; H04W 12/033; H04W 12/06; H04W 60/00; H04W 76/11
See application file for complete search history.

(56) References Cited

U.S. PATENT DOCUMENTS

2020/0137576 A1\* 4/2020 Hu .................. H04W 48/18

FOREIGN PATENT DOCUMENTS

WO WO-2018053804 A1 \* 3/2018 ............ H04W 12/03
WO WO-2018140204 A1 8/2018

OTHER PUBLICATIONS

3rd Generation Partnership Project; Technical Specification Group Services and System Aspects; Study on the Security Aspects of the Next Generation System (Release 14), 3GPP Standard; S3-172095, Technical Report; 3GPP TR 33.899, 3rd Generation Partnership Project (3GPP), Mobile Competence Centre; 650, Route Des Lucioles; F-06921 Sophia-Antipolis Cedex; France, vol. SA WG3, No. v1.3.0, Aug. 21, 2017, 605 pages, XP051336126,Retrieved from the Internet: URL: http://www.3gpp.org/ftp/tsg_sa/WG3_Security/TSGS3_88_Dali/Docs/ [retrieved on Aug. 21, 2017] the whole document.
(Continued)

*Primary Examiner* — Izunna Okeke
(74) *Attorney, Agent, or Firm* — Yanling Yang

(57) ABSTRACT

Methods, systems, and devices for wireless communications are described. A user equipment (UE) may receive a system parameter identified by a network entity (e.g., a public key generator (PKG)), and receive a cell identifier during a connection procedure between the UE and a base station in wireless communication with the UE. The cell identifier may be associated with the base station. The UE may encrypt at least a portion of a message associated with the connection procedure using the cell identifier and the system parameter. In some examples, the portion of the message may include private information. The UE may transmit the message to the base station as part of the connection procedure.

27 Claims, 20 Drawing Sheets

(51) Int. Cl.
　　　*H04W 76/11*　　(2018.01)
　　　*H04W 8/02*　　(2009.01)
　　　*H04W 60/00*　　(2009.01)
　　　*H04W 12/02*　　(2009.01)
　　　*H04W 12/06*　　(2021.01)
　　　*H04L 9/08*　　(2006.01)
　　　*H04W 12/033*　　(2021.01)
　　　*H04W 12/106*　　(2021.01)

(52) U.S. Cl.
　　　CPC ......... *H04W 12/033* (2021.01); *H04W 12/06* (2013.01); *H04W 12/106* (2021.01); *H04W 60/00* (2013.01); *H04W 76/11* (2018.02); *H04L 2209/80* (2013.01)

(56) References Cited

OTHER PUBLICATIONS

Ericsson: "Discussion for Drafting Reply to S2-175309, Relates NSSAI Privacy", 3GPP Draft, 3GPP TSG SA WG3 (Security) Meeting #88, S3-171790 Discussion Reply LS (S2-175309), NSSAI Privacy, 3rd Generation Partnership Project (3GPP), Mobile Competence Centre, 650, Route Des Lucioles, F-06921, Sophia-Antipolis Cedex, France, vol. SA WG3, No. Dali, China; Aug. 7, 2017-Aug. 11, 2017, Aug. 6, 2017 (Aug. 6, 2017), XP051310910, 5 pages, Retrieved from the Internet:URL:http://www.3gpp.org/ftp/Meetings_3GPP_SYNC/SA3/Docs/ [retrieved on Aug. 6, 2017], the whole document.
International Search Report and Written Opinion—PCT/US2019/059207—ISA/EPO—dated Jul. 15, 2020 (190193WO).

* cited by examiner

IDENTITY-BASED ENCRYPTION OF A MESSAGE ASSOCIATED WITH A CONNECTION PROCEDURE

CROSS REFERENCE

The present application for patent claims the benefit of U.S. Provisional Patent Application No. 62/754,424 by LEE et al., entitled "IDENTITY-BASED ENCRYPTION ASSOCIATED WITH A CONNECTION COMPLETE MESSAGE," filed Nov. 1, 2018, assigned to the assignee hereof, and which is expressly incorporated by reference herein.

BACKGROUND

The following relates generally to wireless communications, and more specifically to identity-based encryption (IBE) of a message associated with a connection procedure.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, communications may be protected. Protected communications may include communications that contain private or confidential information. However, some types of communications may lack protection or security. In particular, messages communicated before security algorithms have been agreed upon between a UE and base station may lack adequate protection. As another example, messages for establishing communication may also lack adequate security. Unprotected access stratum (AS) and non-access stratum (NAS) messages, and in particular, those used to attach a UE to a network, may be examples of such unprotected communications. Unprotected communications may be subject to exploitation by attackers, for example.

SUMMARY

A user equipment (UE) may perform a connection procedure with a base station (e.g., gNodeB (gNB)). As part of the connection procedure, both the UE and base station may communicate messages, which may contain private information. For example, the private information may contain one or more single-network slice selection assistance information (S-NSSAI) values, among other information relevant to the connection procedure. Because the private information may be exchanged before an access stratum (AS) security procedure, this information may be unprotected (e.g., unencrypted, unciphered). As a result, either or both the UE and base station may be susceptible to a security threat (e.g., identification of service(s) that the UE is accessing and/or identification of the UE based on service identification). To eliminate or reduce security threats related to the connection procedure, an access and mobility management function (AMF) may provision the UE with system parameters also referred to herein as public parameters of the wireless communications system, which may be used to encrypt the private information using identity-based cryptography, such as identity-based encryption (IBE). The base station may also be provisioned with a private key that allows the base station to decrypt the private information.

A method of wireless communications at a UE is described. The method may include receiving a system parameter identified by a network entity, receiving a cell identifier during a connection procedure between the UE and a base station in wireless communication with the UE, where the cell identifier is associated with the base station, encrypting at least a portion of a message associated with the connection procedure, where encryption of the message is based on the cell identifier and the system parameter, and transmitting the message to the base station.

An apparatus for wireless communications is described. The apparatus may include a processor, memory in electronic communication with the processor, and instructions stored in the memory. The instructions may be executable by the processor to cause the apparatus to receive a system parameter identified by a network entity, receive a cell identifier during a connection procedure between the apparatus and a base station in wireless communication with the apparatus, where the cell identifier is associated with the base station, encrypt at least a portion of a message associated with the connection procedure, where encryption of the message is based on the cell identifier and the system parameter, and transmit the message to the base station.

Another apparatus for wireless communications is described. The apparatus may include means for receiving a system parameter identified by a network entity, receiving a cell identifier during a connection procedure between the apparatus and a base station in wireless communication with the apparatus, where the cell identifier is associated with the base station, encrypting at least a portion of a message associated with the connection procedure, where encryption of the message is based on the cell identifier and the system parameter, and transmitting the message to the base station.

A non-transitory computer-readable medium storing code for wireless communications at a UE is described. The code may include instructions executable by a processor to receive a system parameter identified by a network entity, receive a cell identifier during a connection procedure between the UE and a base station in wireless communication with the UE, where the cell identifier is associated with the base station, encrypt at least a portion of a message associated with the connection procedure, where encryption of the message is based on the cell identifier and the system parameter, and transmit the message to the base station.

A method of wireless communications at a base station is described. The method may include receiving a message from a UE in wireless communication with the base station, where at least a portion of the message is encrypted via encryption based on a cell identifier associated with the base station and a system parameter identified by a network entity and decrypting at least the portion of the message based on a security key associated with the cell identifier.

An apparatus for wireless communications is described. The apparatus may include a processor, memory in electronic communication with the processor, and instructions stored in the memory. The instructions may be executable by the processor to cause the apparatus to receive a message from a UE in wireless communication with the apparatus, where at least a portion of the message is encrypted via encryption based on a cell identifier associated with the apparatus and a system parameter identified by a network entity and decrypt at least the portion of the message based on a security key associated with the cell identifier.

Another apparatus for wireless communications is described. The apparatus may include means for receiving a message from a UE in wireless communication with the apparatus, where at least a portion of the message is encrypted via encryption based on a cell identifier associated with the apparatus and a system parameter identified by a network entity and decrypting at least the portion of the message based on a security key associated with the cell identifier.

A non-transitory computer-readable medium storing code for wireless communications at a base station is described. The code may include instructions executable by a processor to receive a message from a UE in wireless communication with the base station, where at least a portion of the message is encrypted via encryption based on a cell identifier associated with the base station and a system parameter identified by a network entity and decrypt at least the portion of the message based on a security key associated with the cell identifier.

A method of wireless communications at an AMF is described. The method may include receiving a system parameter identified by a network entity and transmitting, in a message the system parameter, to a UE in wireless communication with the AMF, where the system parameter is used to encrypt and decrypt transmissions between the UE and a base station in wireless communications with the UE.

An apparatus for wireless communications at an AMF is described. The apparatus may include a processor, memory in electronic communication with the processor, and instructions stored in the memory. The instructions may be executable by the processor to cause the apparatus to receive a system parameter identified by a network entity and transmit, in a message the system parameter, to a UE in wireless communication with the AMF, where the system parameter is used to encrypt and decrypt transmissions between the UE and a base station in wireless communications with the UE.

Another apparatus for wireless communications at an AMF is described. The apparatus may include means for receiving a system parameter identified by a network entity and transmitting, in a message the system parameter, to a UE in wireless communication with the AMF, where the system parameter is used to encrypt and decrypt transmissions between the UE and a base station in wireless communications with the UE.

A non-transitory computer-readable medium storing code for wireless communications at an AMF is described. The code may include instructions executable by a processor to receive a system parameter identified by a network entity and transmit, in a message the system parameter, to a UE in wireless communication with the AMF, where the system parameter is used to encrypt and decrypt transmissions between the UE and a base station in wireless communications with the UE.

DETAILED DESCRIPTION

A base station and a user equipment (UE) may perform a connection procedure with a base station, for example, such as a radio resource control (RRC) connection procedure. As part of the RRC connection procedure, both the base station and UE may exchange multiple messages. In some examples, the messages, however, may be vulnerable to interception by another communication device (e.g., another UE or base station) and pose security challenges for either or both the base station and UE. Although some techniques exist to protect the exchange of messages after the RRC connection procedure (e.g., as part of an access stratum (AS) security procedure), there may be elements of the messages in the connection procedure that contain information that is unprotected and important. Simply eliminating the information from the messages, however, may result in connection setup latency. The described techniques herein may therefore provide improvements in securing information in messages exchanged as part of a connection procedure. For example, to eliminate or reduce security threats related to the connection procedure, an access and mobility management function (AMF) may provision the UE with a system parameter, which may be used to encrypt the private information using identity-based cryptography, such as identity-based encryption (IBE). The base station may also be provisioned with a private key that allows the base station to decrypt the private information.

Particular aspects of the subject matter described herein may be implemented to realize one or more advantages. The described techniques may support improvements in securing and protecting communications, decreasing signaling overhead, and improving reliability, among other advantages. As such, supported techniques may include improved network operations and, in some examples, may promote network efficiencies, among other benefits.

Aspects of the disclosure are initially described in the context of a wireless communications system. Aspects of the disclosure are then described in the context of a process flow. Aspects of the disclosure are further illustrated by and described with reference to apparatus diagrams, system diagrams, and flowcharts that relate to IBE of a message associated with a connection procedure.

Figure 1:
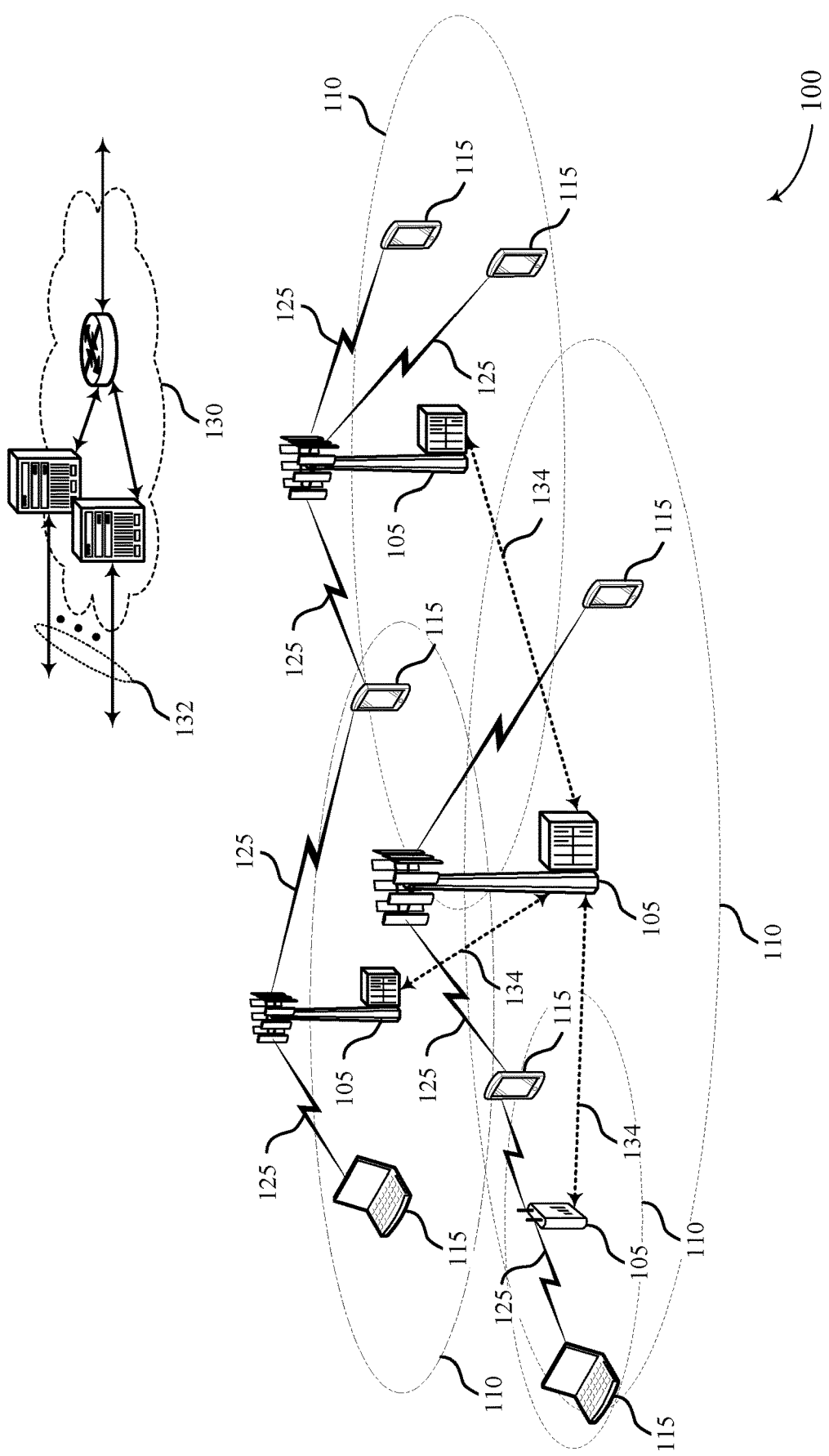
FIGS. 1 and 2 illustrate examples of a wireless communications system that supports identity-based encryption (IBE) of a message associated with a connection procedure in accordance with aspects of the present disclosure.

FIG. 1 illustrates an example of a wireless communications system 100 that supports IBE of a message associated with a connection procedure in accordance with aspects of the present disclosure. Security benefits may be realized using IBE schemes to reduce privacy risks, for example in enterprises (e.g., email filtering). The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130). The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz. Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs). In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115. Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers. In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable. Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A base station 105 (e.g., gNodeB (gNB)) may perform a connection procedure with a UE 115. For example, the connection procedure may be a radio resource control (RRC) connection establishment procedure. As part of the RRC connection establishment procedure, both the base station 105 and UE 115 may communicate messages, which may contain private information. For example, the private information may contain one or more single-network slice selection assistance information (S-NSSAI) values or a list of S-NSSAI values, among other information applicable to the RRC connection establishment procedure. In some examples, the private information may be exchanged as part of an access stratum (AS) security procedure. For example, initial non-access stratum messages of the AS security procedure may provide protection for the private information.

The private information however, may be exchanged before the AS security procedure, in some examples. In this case, the information may be unprotected (e.g., unencrypted, unciphered). As a result, either or both the base station 105 and UE 115 may be susceptible to a security risk (e.g., a replay attack from another base station 105 or UE 115). In some examples, the private information may include one or more S-NSSAI values or a list of S-NSSAI values that may be communicated by the UE 115 to an access and mobility management function (AMF) residing in the core network 130. If the UE 115 has a security context, the one or more S-NSSAI values or the list of S-NSSAI values may be ciphered (i.e., included in ciphertext in an information element (IE) of a control message). Otherwise, if the UE 115 does not have a security context, the one or more S-NSSAI values or the list of S-NSSAI values may be included in a non-access stratum message, upon authentication of the UE 115.

For example, the base station 105 may receive one or more S-NSSAI values or a list of S-NSSAI values in an RRC message (e.g., in an RRC setup complete message (RRC-message5)) for AMF selection. If the private information (e.g., the one or more S-NSSAI values or the list of S-NSSAI values) is removed from the RRC message, the base station 105 may be unable to select an AMF that can handle a network slice based at least in part on an S-NSSAI value, in case of AMF relocation. This may also result in connection setup latency for the UE 115. As an alternative solution, and to decrease security risks related to the connection procedure and eliminate avoidable connection setup latency, an AMF may provision the UE 115 with a system parameter, which may be used to encrypt the private information or messages including the private information using identity-based cryptography, such as IBE. Some examples of IBE schemes may include, but are not limited to, a Boneh-Franklins scheme, a Boneh-Boyen scheme, a Sakai-Kasahara scheme, etc.

IBE schemes provide mechanisms to avoid challenges encountered in traditional certificate-based public key infrastructures (PKI). Although certificate-based PKI schemes are widely deployed to secure messages, these schemes, when used in wireless communications systems (e.g., cellular systems) to protect RRC messages, pose some disadvantageous such as certificate management (e.g., issue, revocation (e.g., a certificate revocation list (CRL), online certification status protocol (OCSP))), extensive signaling overhead (e.g., certificate broadcasting over system information blocks (SIBs)), certification verification overhead, certification validation against revocation, among others. In contrast with certificate-based PKI schemes, IBE schemes extend some advantageous unattainable using the certificate-based PKI schemes. For example, IBE schemes provide simpler deployments (e.g., deployed using a key management service (KMS) collocated with an AMF or a security anchor function (SEAF)), support public parameter (also referred to herein as "a system parameter") provisioning (e.g., as part of a registration procedure), require no verification for individual certificates (e.g., device identifier is a public key associated with the public parameter), etc. Thereby, identity-based cryptography provides lower complexity and privacy enhancement, all of which may be provided with minimal messaging overhead.

In an example identity-based cryptography scheme, a public key generator (PKG) or a key management system (KMS) may generate either or both a public key ($PK_A$) and a private key ($SK_A$) that may be based in part on an identity of a device (e.g., base station 105, or a cell belonging to the base station 105). For example, the base station 105 may register its identity of a cell that belongs to it (e.g., $ID_A$) with the PKG, where "A" is representative of the device associated with the identity ID. The public key of the base station 105 may be based in part on hashing the identity of the base station 105 (e.g., $H(ID_A)$, where H is a hash function). The PKG may contain cryptographic information (also referred to herein as "a master secret (s)") to generate a private key, which can be shared by the PKG to correspond to the given identity of the base station 105. For example, the PKG may generate a private key ($SK_A$) associated with the identity ($ID_A$) of the base station 105 using the master secret s (e.g., $SK_A$ is equal to $sPK_A$). The PKG may then share the private key with the base station 105 over a secure channel. In some examples, the PKG may be an AMF or a SEAF (not shown) in the wireless communications system 100.

In some examples, the PKG may generate either or both the public key and private key using a pairing-based method. In the pairing-based method, the PKG may perform a pairing between elements of at least two cryptographic groups (e.g., a first group G1 and a second group G2) having a prime order p. In some examples, the pairing may be a bilinear pairing. For example, the PKG may map G1 and G2 to a third group G3. As part of the identity-based cryptography scheme, the PKG may also generate, determine, identify, or select a public parameter P. In some examples, the public parameter P may be an element belonging to either or both G1 or G2 (i.e., P∈G1 or P∈G2). The public key may be based in part on the public parameter and the master secrets (i.e., $PK_A$ is equal to sP). The $PK_A$ is the public key of PKG and used with the public parameter P for encryption. The PKG may share the public key with the UE 115, for example (or could simply share the public parameter P with the UE 115 and allow UE 115 to generate the public key based at least in part on P. In some examples, to encrypt a message, a transmitting device (e.g., a UE 115) may use the public key of the PKG and an identity of the receiving device (e.g., a cell ID associated with the base station 105). Alternatively, a UE 115 may randomly generate a key and use the key to encrypt a control message (e.g., an RRC message). The UE 115 may then encrypt the randomly generated key using the identity-based encryption (i.e., the receiver ID and $PK_{PKG}$.

By way of example, the UE 115 may encrypt a control message ($M \in \{0,1\}^n$) for the base station 105 in accordance with the identity-based cryptography scheme described herein. The UE115 may generate a public key according to an identity of the base station 105 and using a hash function (e.g., $PK_A = H(ID_A)$, where H is a hash function, and where A represents the receiving device (base station 105, in this case)). The UE 115 may then perform a pairing between a public key $PK_A$ associated with the base station 105 and a public key $PK_{PKG}$ shared by the PKG. The UE 115 may then select a random number r. Following, the UE 115 may generate a parameter (e.g., U=rP) and encrypt the message according to the following expression $M \oplus H(g^r)$, where P is a public parameter, r is a random number, M is the message, H is a cryptographic hash function (e.g., SHA-256), g is the paired group, $\oplus$) is the exclusive OR operation, and $M \oplus H$ ($g^r$) is the resultant encrypted message. The UE 115 may transmit either or both the parameter (U) and the encrypted message ($M \oplus H(g^r)$) to the base station 105. Although the above example for encryption is explained from the UE 115 perspective, a base station 105 may perform the same or similar operations to encrypt messages to a UE 115.

To decrypt the message, the receiving device (e.g., a base station 105) may obtain the private key (e.g., $SK_A$) from the PKG, and decrypt the message using the private key and the public key (e.g., $PK_{PKG}$) received from the transmitting device (e.g., a UE 115). For example, the base station 105 may decrypt the encrypted message according to the following equations (1) and (2).

$$e(SK_A, U) = e(sPK_A, rP) = e(PK_A, P)^{s \cdot r} = e(PK_A, sP)^r = e(PK_A, PK_{PKG})^r = g^r \quad (1)$$

$$V \oplus H(e(SK_A, U)) = V \oplus H(g^r) = M \oplus H(g^r) \oplus H(g^r) = M \quad (2)$$

Accordingly, either or both the base station 105 and UE 115 may support security procedures to mitigate the capabilities of attackers or other third parties from obtaining private information. Techniques stemming from identity-based cryptography, such as IBE, may encrypt a message using one or more unique identifiers. As explained herein, some benefits of this technique may include attack mitigation (such as mitigation of denial of service or bidding-down attacks) and privacy enhancement, all of which may be provided with minimal messaging overhead.

Figure 2:
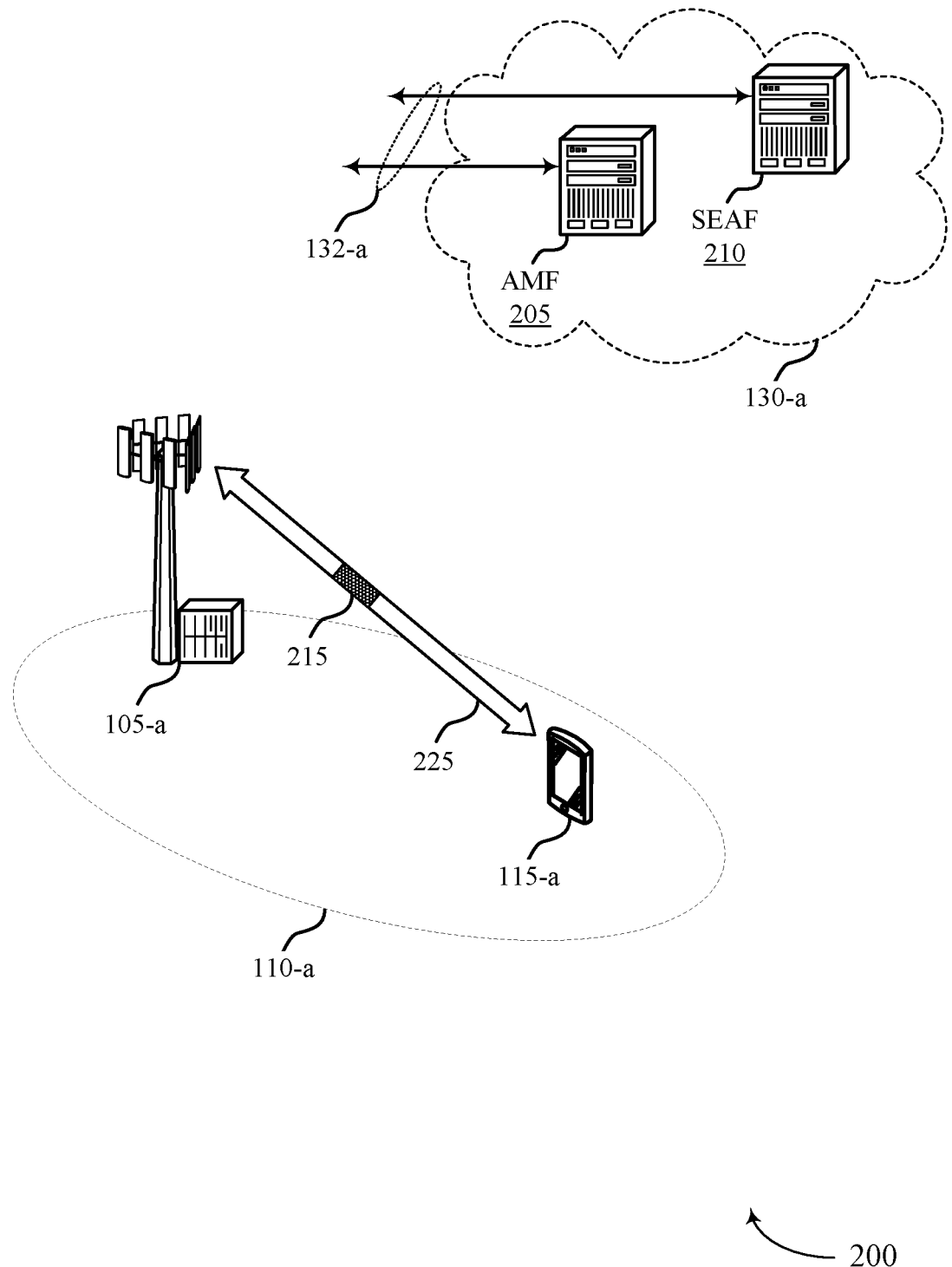

FIG. 2 illustrates an example of a wireless communications system 200 that supports IBE of a message associated with a connection procedure in accordance with aspects of the present disclosure. The wireless communications system 200 may include a base station 105-a and a UE 115-a, which may be examples of the corresponding devices described with reference to FIG. 1. In some examples, the wireless communications system 200 may also include an AMF 205 and a SEAF 210, which may be examples of the corresponding devices described with reference to FIG. 1. For example, either or both the AMF 205 and SEAF 210 may be part of a core network 130-a, which may be an example of a core network described with reference to FIG. 1. The wireless communications system 200 may include others functions or devices not shown, or may not include one or more of the functions or devices shown.

The wireless communications system 200 may also implement aspects of the wireless communications system 100. For example, the base station 105-a, the UE 115-a, the AMF 205, or the SEAF 210, or a combination thereof may support security procedures to mitigate the capabilities of attackers or other third parties from obtaining private information. The base station 105-a may communicate with the UE 115-a within a coverage area 110-a, and either or both the AMF 205 and SEAF 210 may communicate with either or both the base station 105-a and UE 115-a via communication links 132-a (e.g., via an S1, N2, N3, or other interface).

The base station 105-a may perform a connection procedure (e.g., an RRC procedure, such as a cell acquisition procedure, a random access procedure, an RRC connection establishment procedure, an RRC configuration procedure) with the UE 115-a. The base station 105-a may be configured with multiple antennas, which may be used for directional or beamformed transmissions. As part of the connection procedure, the base station 105-a may establish a bidirectional communication link 225 for communication with the UE 115-a. In some examples, as part of the connection procedure, the UE 115-a may request a session related to one or more network slices. Before establishing the session, the UE 115-a may provide information to the base station 105-a that may lead to the session establishment. For example, the UE 115-a may provide information such as UE capability, resource requirements for a session, a priority of the session, among other information, which the base station 105-a may use to select an AMF (e.g., the AMF 205) that supports the session via one or more network slices.

The UE 115-a may communicate private information to the base station 105-a, as part of the connection procedure. For example, the private information may contain one or more S-NSSAI values or a list of S-NSSAI values, among other information applicable to the requested session and connection procedure. In some examples, the private information may be exchanged as part of an AS security procedure. For example, initial non-access stratum messages of the AS security procedure may provide protection for the private information. However, in some examples, the private information may be exchanged before the AS security procedure. In this case, the information may be unprotected. As a result, either or both the base station 105-a and UE 115-a may be susceptible to a security risk. To decrease security risks related to the connection procedure and decrease latency in the wireless communications system 200, the AMF 205 may provision either or both the base station 105-a and UE 115-a with a system parameter, which may be used to encrypt the private information or messages including the private information using identity-based cryptography, such as IBE.

The AMF 205 may perform various procedures based on policies, protocols, or the received information. The various procedures may support termination of non-access stratum signaling, NAS ciphering and integrity protection, registration management, connection management, mobility management, access authentication and authorization, security context, among others. By way of example, the AMF 205 may select an appropriate SEAF (e.g., the SEAF 210) for authentication and security functionality. The AMF 205 may receive a system parameter identified by a network entity, for example, such as the SEAF 210. The system parameter may be a public parameter in identity-based cryptography for securing private information in messages exchanged between the base station 105-a and UE 115-a during the connection procedure. That is, the system parameter may be used to encrypt and decrypt transmissions between the base station 105-a and UE 115. In some examples, either or both the AMF 205 or SEAF 210 may provision the system parameter, for example, when the AMF 205 or SEAF 210 are collocated and support PKG functionality. The AMF 205 may transmit, in a control message, the system parameter to either or both the base station 105-a and UE 115-a.

The UE 115-a may receive the system parameter from the AMF 205. In some examples, the UE 115-a may receive a cell identifier from the base station 105-a during the connection procedure. For example, the base station 105-a may transmit and the UE 115-a may receive a system information block including the cell identifier associated with the base station 105-a. In some examples, the base station 105-a may be associated with a set of cells. In these examples, the base station 105-a may provide a cell identifier of a cell in which the UE 115-a belongs. The UE 115-a may encrypt at least a portion (carrying private information) of a message 215 associated with the connection procedure using the cell identifier and the system parameter based on an identity-based cryptography scheme.

In some examples, the system information block may provide an indication to the UE 115-a about whether identity-based cryptography is supported by the base station 105-a. For example, an information element in the system information block may be defined to provide the indication. The UE 115-a may use identity-based cryptography when the base station 105-a supports it. If the base station 105-a does not support identity-based cryptography, the UE 115-a may refrain from including private information (privacy sensitive information) in the message 215. In some examples, the UE 115-a may fallback to a legacy-based approach. For example, information elements defined as non-critical extensions in the message 215 may be discarded by the base station 105-a, and once ciphered information elements are discarded, the UE 115-a may fallback to using a legacy-based approach.

The portion of the message 215 encrypted using the cell identifier and the system parameter may include private information. For example, the UE 115-a may encrypt an information element in the message 215 using the cell identifier and the system parameter, and the information element may include one or more S-NSSAI values or a list of S-NSSAIs values, which may be associated with the session request by the UE 115-a. In another example, the connection procedure may be an RRC connection establishment procedure, and the message 215 may be an RRC message such as, a connection complete message, where the information element may be an RRC-specific information element.

In some examples, the UE 115-a may receive the system parameter in a non-access stratum message from the AMF 205. For example, the UE 115-a may transmit a registration request message to the AMF 205, and receive the system parameter from the AMF 205 as part of a registration accept message responsive to the registration request message. Additionally, or alternatively, the UE 115-a may participate in an authentication procedure with the AMF 205 based on the registration request message, and the system parameter may be received as part of a non-access stratum message from the AMF 205 in response to the authentication procedure. In some examples, the non-access stratum message may be a security mode command message. The non-access stratum message may also be integrity protected using a key derived based on the authentication procedure.

The UE 115-a may encrypt the portion of the message 215 (carrying the private information), in some examples, based on a non-access stratum count. For example, the UE 115-a may identify a non-access stratum count associated with the non-access stratum message and increment the non-access stratum count accordingly. In this example, based on incrementing the non-access stratum count, the UE 115-a may encrypt the portion of the message 215 (carrying the private information). The UE 115-a may include in the portion of the message 215 a random parameter (e.g., non-access stratum count) associated with the UE 115-a. The random parameter may prevent dictionary attacks (i.e., the random parameter is used to make the encrypted portion of the message 215 appear different even if the encrypted portion is created using the same S-NSSAIs).

In some cases, the encryption of the portion of the message 215 associated with the connection procedure may occur before an AS security setup procedure. In this case, the UE 115-a may include a temporary key that may be used for the message 215 exchange when the exchange occurs before the AS security setup procedure. The temporary key (e.g., a randomly generated key by the UE 115-a) may be based at least in part on a list of temporary identifiers such as, a temporary mobile subscriber identifier, a hash-based temporary mobile subscriber identifier, or a global unique temporary identifier, or a combination thereof. The list of temporary identifiers may be used as a randomness parameter(s) for the identity-based cryptography (e.g., IBE). As such, the UE 115-a may encrypt at least the portion of the message 215 using the temporary mobile subscriber identifier, the hash-based temporary mobile subscriber identifier, or the global unique temporary identifier, or a combination thereof as the input parameter(s) of encryption.

Either or both the base station 105-a and the AMF 205 may transmit a global unique temporary identifier to the UE 115-a after a successful activation of non-access stratum security. In some examples, the AMF 205 may transmit a global unique temporary identifier to the UE 115-a in a registration accept message based on receiving a registration request message (e.g., initial registration, mobility registration) from the UE 115-a. Alternatively, the AMF 205 may transmit a global unique temporary identifier to the UE 115-a in a registration accept message based on receiving a periodic registration update message from the UE 115-a. In some cases, the AMF 205 may use a UE configure updated procedure to transmit a global unique temporary identifier to the UE 115-a, upon receiving a network triggered service request message from the UE 115-a (e.g., a service request message transmitted by the UE 115-a in response to a paging message). The UE configuration update procedure may be used before a current non-access stratum signaling connection is released (i.e., it may not be part of the session request because doing so may delay the session request).

Once the UE 115-a transmits the message 215 to the base station 105-a, the base station 105-a may decrypt the encrypted portion of the message 215 based on a security key associated with the cell identifier. The security key may be generated based on the cell identifier, the system parameter, or a secret key known to either or both the AMF 205 and SEAF 210, or a combination thereof. For example, the base station 105-a may receive the security key from either the AMF 205 or the SEAF 210. In some examples, the base station 105-a may receive a set of security keys, each of the security keys being associated with the cell identifier associated with the base station 105-a.

As part of decrypting the message 215, the base station 105-a may decrypt one or more S-NSSAI values or a list of S-NSSAI values from the message 215, and select the AMF 205 based on the one or more S-NSSAI values or a list of S-NSSAI values. For example, the base station 105-a may select the AMF 205 because the AMF 205 may serve the slices identified by the S-NSSAI (part of the session request from the UE 115-a). Additionally or alternatively, as part of decrypting the message 215, the base station 105-a may decrypt the message 215 based on the random parameter. Upon selecting the AMF 205 based on the AMF 205 supporting the network slices identified by the S-NSSAIs, the AMF 205 may establish the session with the UE 115-a.

In the resulting description of the wireless communications system 200, the UE 115-a may be registered to a network (e.g., the base station 105-a) and have a non-access stratum security established. The UE 115-a may transmit an encrypted initial message to the base station 105-a, for example, including one or more S-NSSAI values (or a set of S-NSSAI values) for AMF selection, before establishing AS security with the base station 105-a. To protect information in the encrypted initial message, the UE 115-a may obtain a network public parameter ($P_K$) (also referred to herein as a system parameter) during the registration. In some examples, the UE 115-a may obtain the public parameter from a dedicated PKG in a serving network (e.g., from the SEAF 210-a). As part of protecting the message, the UE 115-a may obtain a cell identifier by reading a system information block from the base station 105-a, and encrypting the message using the public parameter and the cell identifier. In this case, the base station 105-a having the security (private) key associated with the cell identifier from the PKG can decrypt the message.

Accordingly, either or both the base station 105-a and UE 115-a may support security procedures to mitigate the capabilities of attackers or other third parties from obtaining private information exchanged during a connection procedure. Techniques stemming from identity-based cryptography, such as IBE, may protect the private information exchanged in these messages. As a result, some benefits of this technique may include attack mitigation (such as mitigation of denial of service or bidding-down attacks) and privacy enhancement, all of which may be provided with minimal messaging overhead.

Figure 3:
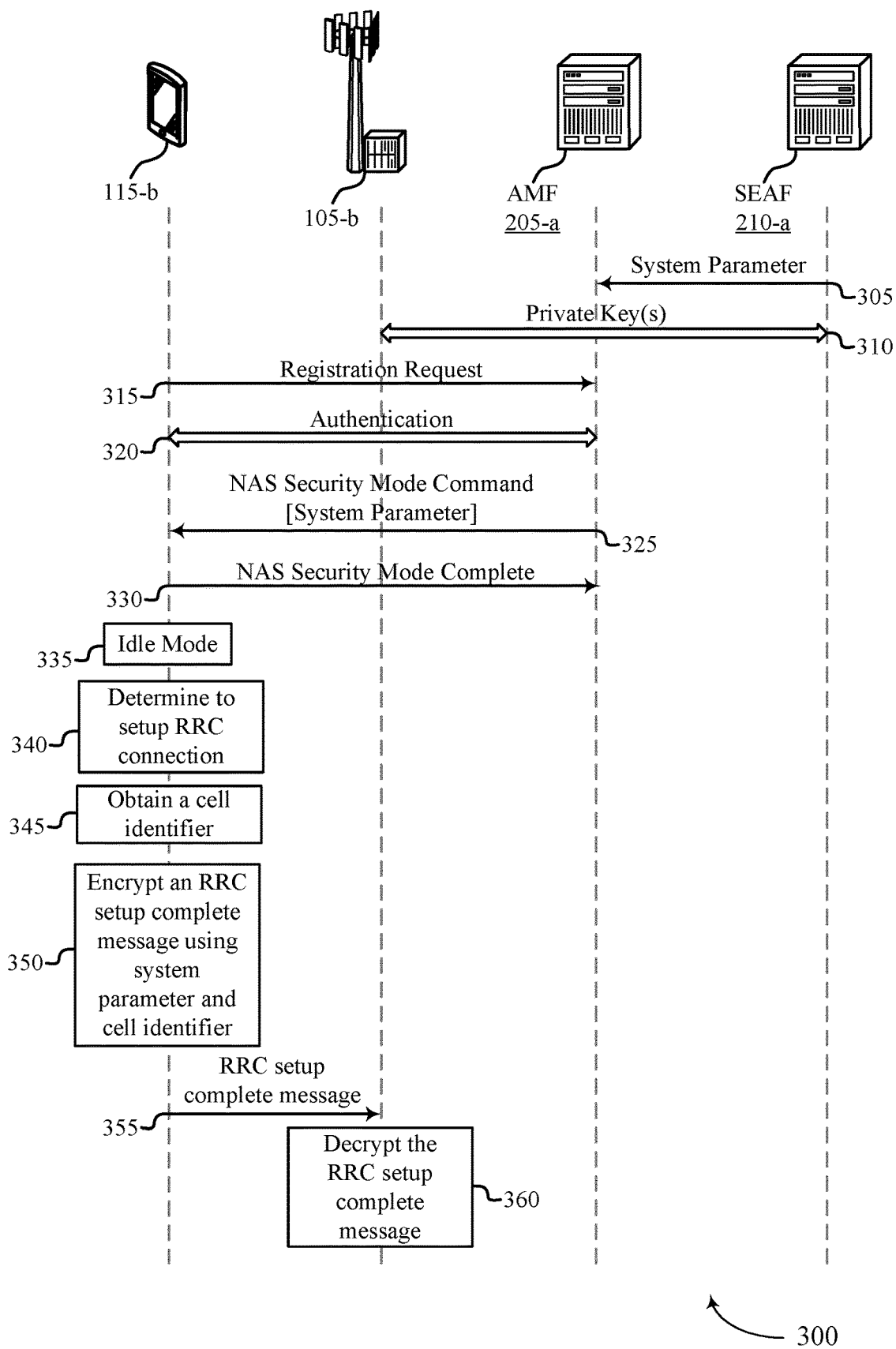
FIG. 3 illustrates an example of a process flow that supports IBE of a message associated with a connection procedure in accordance with aspects of the present disclosure.

FIG. 3 illustrates an example of a process flow 300 that supports IBE of a message associated with a connection procedure in accordance with aspects of the present disclosure. The process flow 300 may include a base station 105-b and a UE 115-b, which may be examples of the corresponding devices described with reference to FIGS. 1 and 2. In some examples, the process flow 300 may additionally, or alternatively, include an AMF 205-a and SEAF 210-a, which may be examples of the corresponding functions or devices described with reference to FIGS. 1 and 2. For example, either or both the AMF 205-a and SEAF 210-a may have PKG functionality. Alternatively, the PKG may be a separate function or device that may provide information (e.g., a public parameter) to either or both the AMF 205-a and SEAF 210-a. For example, a PKG may be collocated with either or both the AMF 205-a and SEAF 210-a. The process flow 300 may implement aspects of the wireless communications system 100 and 200. For example, the base station 105-b, the UE 115-b, the AMF 205-a, or the SEAF 210-a, or a combination thereof may support security procedures using identity-based cryptography to mitigate capabilities of attackers or other third parties from obtaining private information.

In the following description of the process flow 300, the operations between the base station 105-b, the UE 115-b, the AMF 205-a, and the SEAF 210-a may be transmitted in a different order than the exemplary order shown, or the operations performed by the base station 105-b, the UE 115-b, the AMF 205-a, and the SEAF 210-a may be performed in different orders or at different times. Operations may also be left out of the process flow 300, or other operations may be added to the process flow 300.

In some examples, the process flow 300 may commence with the base station 105-b and the UE 115-b performing a connection procedure (e.g., performing a cell acquisition procedure, a random access procedure, an RRC connection procedure, an RRC configuration procedure). In some examples, the entire process flow 300 may be considered a connection procedure. In other examples, process flow 300 may be considered as being comprised of multiple procedures, including a connection procedure. For example, a connection procedure may include aspects of 340, 345, 350, 355, and 360 from process flow 300, and as described below. At 305, the SEAF 210-a may transmit a system parameter to the AMF 205-a, which may be a public parameter in identity-based cryptography. In some examples, the system parameter may be used to encrypt private information or messages including the private information using identity-based cryptography. Alternatively, the SEAF 210-a may transmit a set of system parameters for identity-based cryptography to the AMF 205-a. In this case, each parameter of the set of system parameters may be associated with an index. For example, the AMF 205-a may track the set of system parameters across multiple base stations.

At 310, the SEAF 210-a may provision the base station 105-b with security keys (e.g., one or more private keys ($SK_A$) associated with the base station 105-b. Additionally, the SEAF 210-a may provision the base station 105-b with the system parameter or set of system parameters for identity-based cryptography. The security keys may be associated with one or more cell identifiers (e.g., 28 bit cell identifiers in LTE or 36 bit cell identifiers in NR) associated with the base station 105-b. In some examples, the cell identifiers may be a combination of a public land mobile network (PLMN) identifier and a cell identifier associated with the base station 105-b.

At 315, the UE 115-b may transmit a registration request message to the AMF 205-a. The registration request message at 315 may be an example of a registration procedure, or may be a component of a registration procedure. As an example, a registration procedure may also include the transmission of a registration accept message at 325, as explained herein. A registration procedure may be UE 115-b sending the registration request message to AMF 205-a and receiving the system parameter from AMF 205-a. At 320, the UE 115-b and AMF 205-a may perform an authentication procedure. An authentication procedure may be the verification for individual certificates (e.g., device identifier or a public key associated with the public parameter). At 325, the AMF 205-a may transmit a non-access stratum security mode command message (or a registration accept message) to the UE 115-b. The non-access stratum security mode command message may include the system parameter or the set of system parameters. The non-access stratum message may also be integrity protected using a key derived based on the authentication procedure For example, the AMF 205-a may provide the system parameter with its index during the authentication procedure. At 330, the UE 115-b may transmit a non-access stratum security mode complete message to the AMF 205-a.

At 335, the UE 115-b may switch to idle mode for a remainder of the connection procedure. At 340, the UE 115-b may determine to setup an RRC connection, for example, with the base station 105-b (e.g., as part of a connection procedure). The UE 115-b may switch from the idle mode to a connected mode, and the UE 115-b may obtain a cell identifier, at 345, for example, from the base station 105-b. For example, the UE 115-b may obtain a cell identifier associated with (e.g., corresponding to) the base station 105-b as part of a random access channel (RACH) procedure with the base station 105-b. For example, the base station 105-b may be associated with a set of cells. In these examples, the base station 105-b may provide a cell identifier of a cell in which the UE 115-b belongs. In some examples, the cell identifier may be provided to the UE 115-b in a system information block (e.g., system information block-1, a remaining minimum system information (RMSI)).

At 350, the UE 115-b may encrypt an RRC setup complete message using the system parameter and cell identifier. In some examples, the UE 115-b may encrypt one or more S-NSSAI values or a list of S-NSSAI values in the RRC setup complete message using the system parameter and cell identifier. Additionally or alternatively, the UE 115-b may encrypt a portion of the RRC setup complete message using a temporary mobile subscriber identifier, a hash-based temporary mobile subscriber identifier, or a global unique temporary identifier, or a random sequence number, or a combination thereof. At 355, the UE 115-b may transmit the encrypted RRC setup complete message to the base station 105-b. At 360, the base station 105-b may decrypt the RRC setup complete message based on a security key associated with the cell identifier associated with the base station 105-b. As part of decrypting the RRC setup complete message, the base station 105-b may decrypt one or more S-NSSAI values or a list of S-NSSAI values from the RRC setup complete message, and select the AMF 205-a based on the one or more S-NSSAI values or a list of S-NSSAI values. For example, the base station 105-b may select the AMF 205-a because the AMF 205-a may serve the slices identified by the S-NSSAIs (part of the session request from the UE 115-b).

Accordingly, either or both the basef station 105-b and UE 115-b may support identity-based cryptography to mitigate capabilities of attackers or other third parties from obtaining private information exchanged during a connection procedure. Techniques stemming from identity-based cryptography, such as IBE, may protect the private information exchanged in these messages. As explained herein, some benefits of this technique may include attack mitigation (such as mitigation of denial of service or bidding-down attacks) and privacy enhancement, all of which may be provided with minimal messaging overhead.

Figure 4:
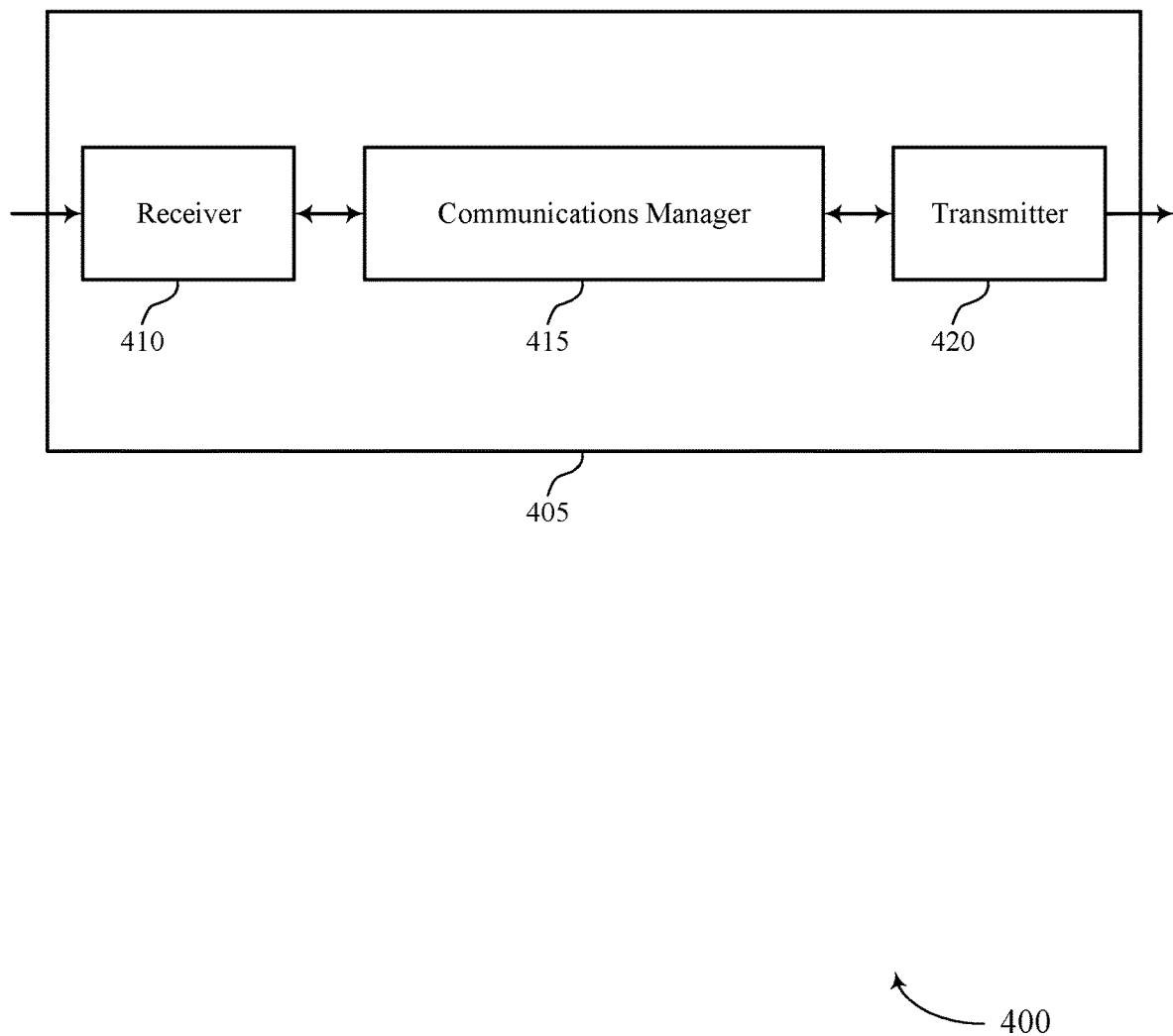
FIGS. 4 and 5 show block diagrams of devices that support IBE of a message associated with a connection procedure in accordance with aspects of the present disclosure.

FIG. 4 shows a block diagram 400 of a device 405 that supports IBE of a message associated with a connection procedure in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to IBE of a message associated with a connection procedure, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may receive a system parameter identified by a network entity, receive a cell identifier during a connection procedure between the device 405 and a base station in wireless communication with the device 405, where the cell identifier is associated with the base station, encrypt at least a portion of a message associated with the connection procedure, where encryption of the message is based on the cell identifier and the system parameter, and transmit the message (e.g., the message associated with the connection procedure is an RRC setup complete message, as illustrated at 355 and described with reference to FIG. 3) to the base station. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver component. For example, the transmitter 420 may be an example of aspects of the transceiver 720 described with reference to FIG. 7. The transmitter 420 may utilize a single antenna or a set of antennas.

In some examples, the communications manager 415 may be implemented as an integrated circuit or chipset for a mobile device modem, and the receiver 410 and transmitter 420 may be implemented as analog components (e.g., amplifiers, filters, antennas) coupled with the mobile device modem to enable wireless transmission and reception over one or more bands.

The communications manager 415 as described herein may be implemented to realize one or more potential advantages. One implementation may allow the device 405 to encrypt a portion of a message based at least in part on a cell identifier and a system parameter. The encrypted message may then be transmitted. This encryption of the portions of a message may increase security, protect privacy, increase reliability and reduce latency during transmissions.

Based on techniques for encrypting portions of a message as described herein, a processor of a UE 115 (e.g., controlling the receiver 410, the transmitter 420, or the transceiver 720 as described with reference to FIG. 7) may increase reliability and decrease signaling overhead in the communication of encrypted messages because the UE 115 may avoid going through unnecessary configuration processes during transmissions.

Figure 5:
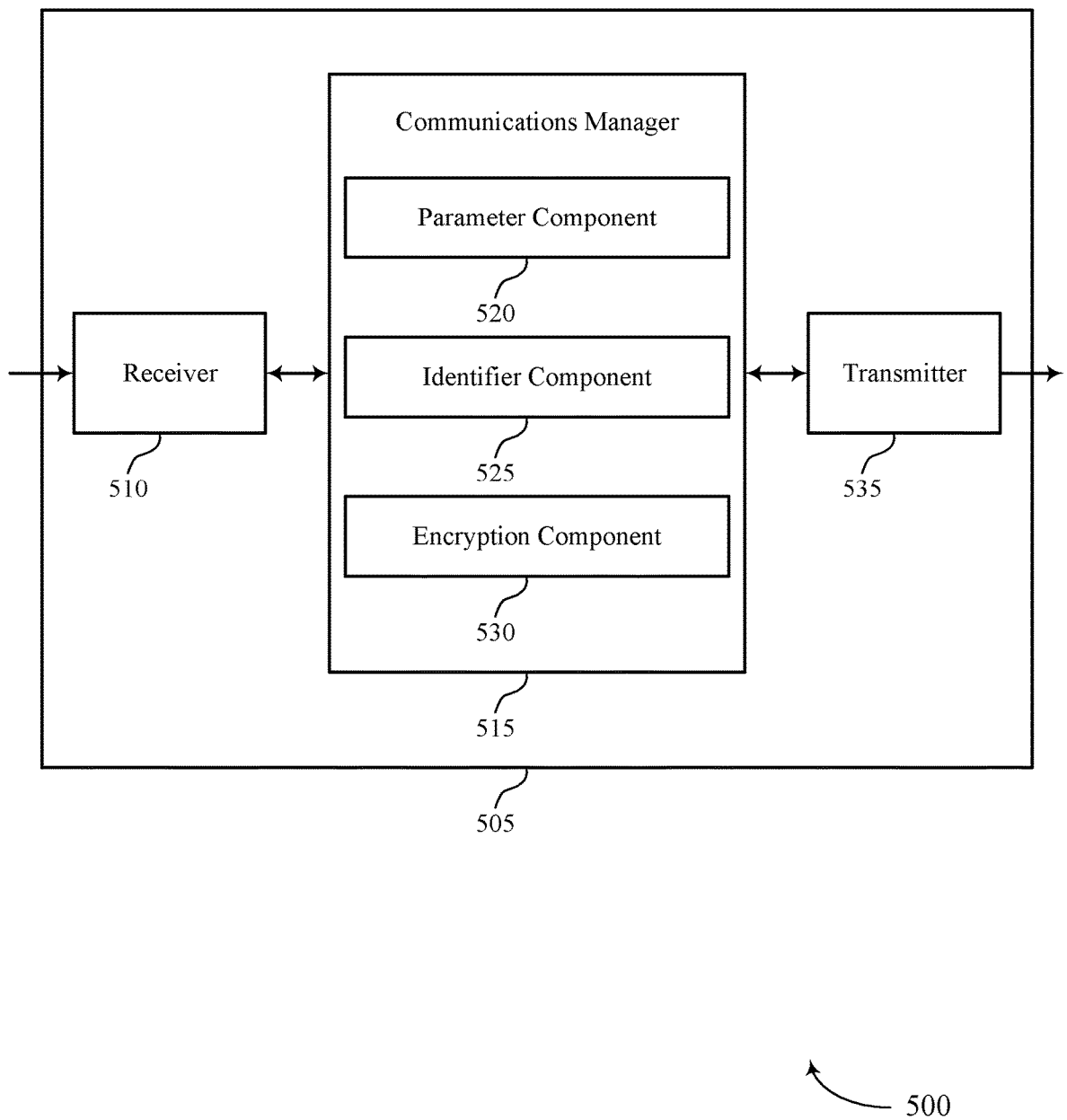

FIG. 5 shows a block diagram 500 of a device 505 that supports IBE of a message associated with a connection procedure in accordance with aspects of the present disclosure. The device 505 may be an example of aspects of a device 405, or a UE 115 as described herein. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to IBE of a message associated with a connection procedure, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a parameter component 520, an identifier component 525, and an encryption component 530. The communications manager 515 may be an example of aspects of the communications manager 710 described herein.

The parameter component 520 may receive a system parameter identified by a network entity. The identifier component 525 may receive a cell identifier during a connection procedure between the device 505 and a base station in wireless communication with the device 505, where the cell identifier is associated with the base station. The encryption component 530 may encrypt at least a portion of a message (e.g., the message associated with the connection procedure is an RRC setup complete message, as illustrated at 355 and described with reference to FIG. 3) associated with the connection procedure, where encryption of the message is based on the cell identifier and the system parameter and transmit the message to the base station.

The transmitter 535 may transmit signals generated by other components of the device 505. In some examples, the transmitter 535 may be collocated with a receiver 510 in a transceiver component. For example, the transmitter 535 may be an example of aspects of the transceiver 720 described with reference to FIG. 7. The transmitter 535 may utilize a single antenna or a set of antennas.

In some examples, the communications manager 515 may be implemented as an integrated circuit or chipset for a mobile device modem, and the receiver 510 and transmitter 535 may be implemented as analog components (e.g., amplifiers, filters, antennas) coupled with the mobile device modem to enable wireless transmission and reception over one or more bands.

The communications manager 515 as described herein may be implemented to realize one or more potential advantages. One implementation may allow the device 505 to encrypt a portion of a message based at least in part on a cell identifier and a system parameter. The encrypted message may then be transmitted. This encryption of the portions of a message may increase security, protect privacy, increase reliability and reduce latency during transmissions.

Based on techniques for encrypting portions of a message as described herein, a processor of a UE 115 (e.g., controlling the receiver 510, the transmitter 535, or the transceiver 720 as described with reference to FIG. 7) may increase reliability and decrease signaling overhead in the communication of encrypted messages because the UE 115 may avoid going through unnecessary configuration processes during transmissions.

Figure 6:
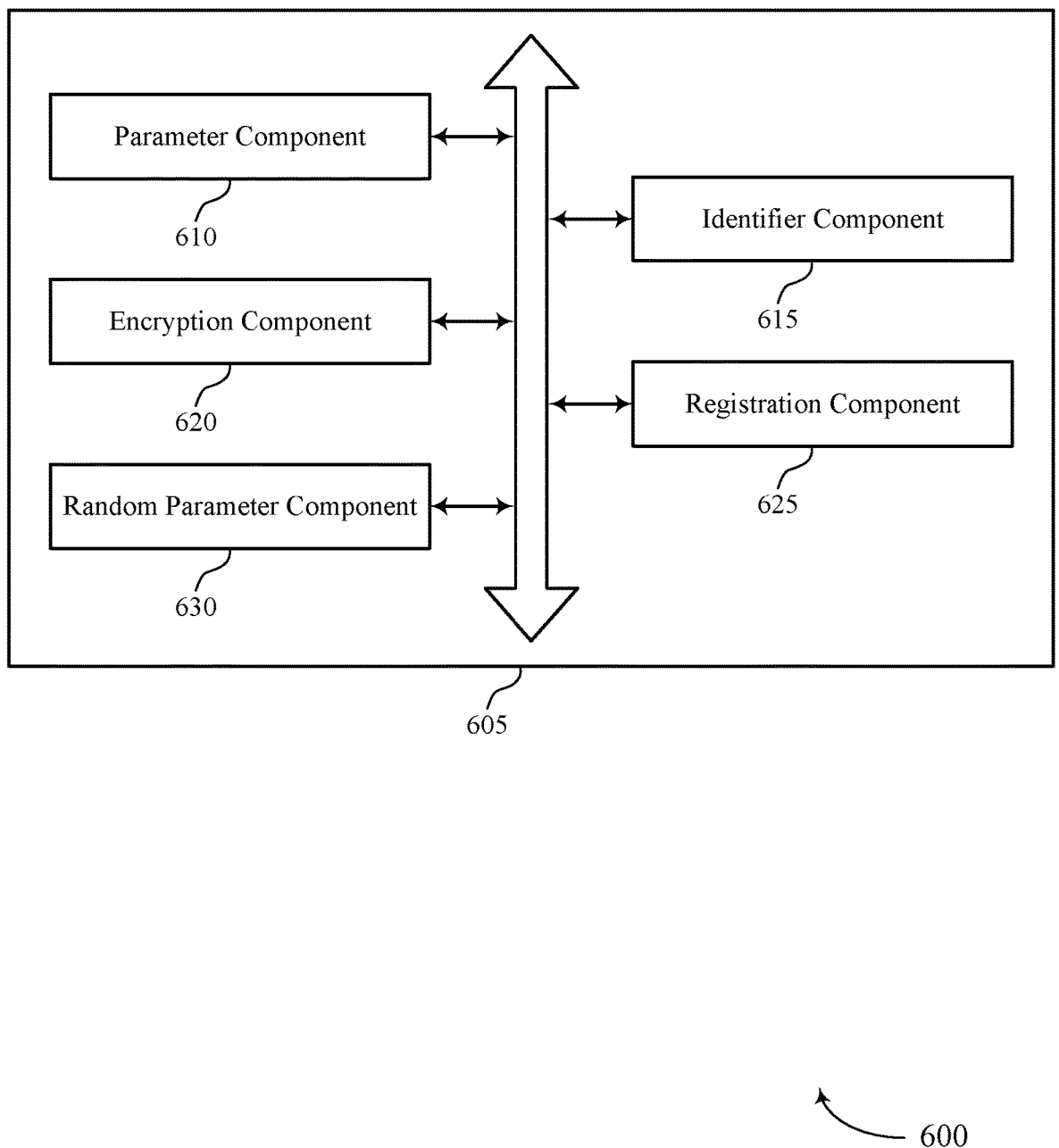
FIG. 6 shows a block diagram of a communications manager that supports IBE of a message associated with a connection procedure in accordance with aspects of the present disclosure.

FIG. 6 shows a block diagram 600 of a communications manager 605 that supports IBE of a message associated with a connection procedure in accordance with aspects of the present disclosure. The communications manager 605 may be an example of aspects of a communications manager 415, a communications manager 515, or a communications manager 710 described herein. The communications manager 605 may include a parameter component 610, an identifier component 615, an encryption component 620, a registration component 625, and a random parameter component 630. Each of these components may communicate, directly or indirectly, with one another (e.g., via one or more buses).

The parameter component 610 may receive a system parameter identified by a network entity. The identifier component 615 may receive a cell identifier during a connection procedure between a UE and a base station in wireless communication with the UE, where the cell identifier is associated with the base station. In some examples, identifying a temporary mobile subscriber identifier, a hash-based temporary mobile subscriber identifier, or a global unique temporary identifier, or a combination thereof, where encrypting at least the portion of the connection complete message further includes encrypting the information element in the message using the temporary mobile subscriber identifier temporary mobile subscriber identifier, the hash-based temporary mobile subscriber identifier, or the global unique temporary identifier, or a combination thereof.

The identifier component 615 may receive a global unique temporary identifier based on a successful activation of non-access stratum security, where encrypting at least the portion of the connection complete message further includes encrypting the information element in the message using the global unique temporary identifier. In some examples, the identifier component 615 may receive the global unique temporary identifier in a registration accept message based on transmitting an initial registration request message or a mobility registration update message. In some examples, the identifier component 615 may receive the global unique temporary identifier in a registration accept message based on transmitting a periodic registration update message. In some examples, the identifier component 615 may receive the global unique temporary identifier using a UE configuration update procedure based on transmitting a network triggered service request message. In some examples, the identifier component 615 may receive a system information block during the connection procedure, the system information block including the cell identifier associated with the base station.

The encryption component 620 may encrypt at least a portion of a message associated with the connection procedure, where encryption of the message is based on the cell identifier and the system parameter. In some examples, the message associated with the connection procedure is an RRC setup complete message, as illustrated at 355 and described with reference to FIG. 3. In some examples, the encryption component 620 may transmit the message to the base station. In some examples, the encryption component 620 may encrypt portions of the message that includes private information. In some examples, the encryption component 620 may encrypt an information element in the message using the cell identifier and the system parameter, the information element including one or more S-NSSAI values or a list of S-NSSAI values. In some examples, the encryption component 620 may encrypt portions of the message based on an IBE.

The registration component 625 may transmit a registration request message to an AMF. In some examples, the registration component 625 may receive the system parameter from the AMF as part of a registration accept message responsive to the registration request message. In some examples, the registration component 625 may participate in an authentication procedure with the AMF based in part on the registration request message, where the system parameter is received as part of a non-access stratum message from the AMF based on the performing an authentication procedure. In some examples, the registration component 625 may identify a non-access stratum count associated with the non-access stratum message. In some examples, the registration component 625 may increment the non-access stratum count based on the identifying, where the encryption of at least the portion of the message is further based on the incremented non-access stratum count. The random parameter component 630 may include in the at least the portion of the connection complete message a random parameter associated with the UE.

Figure 7:
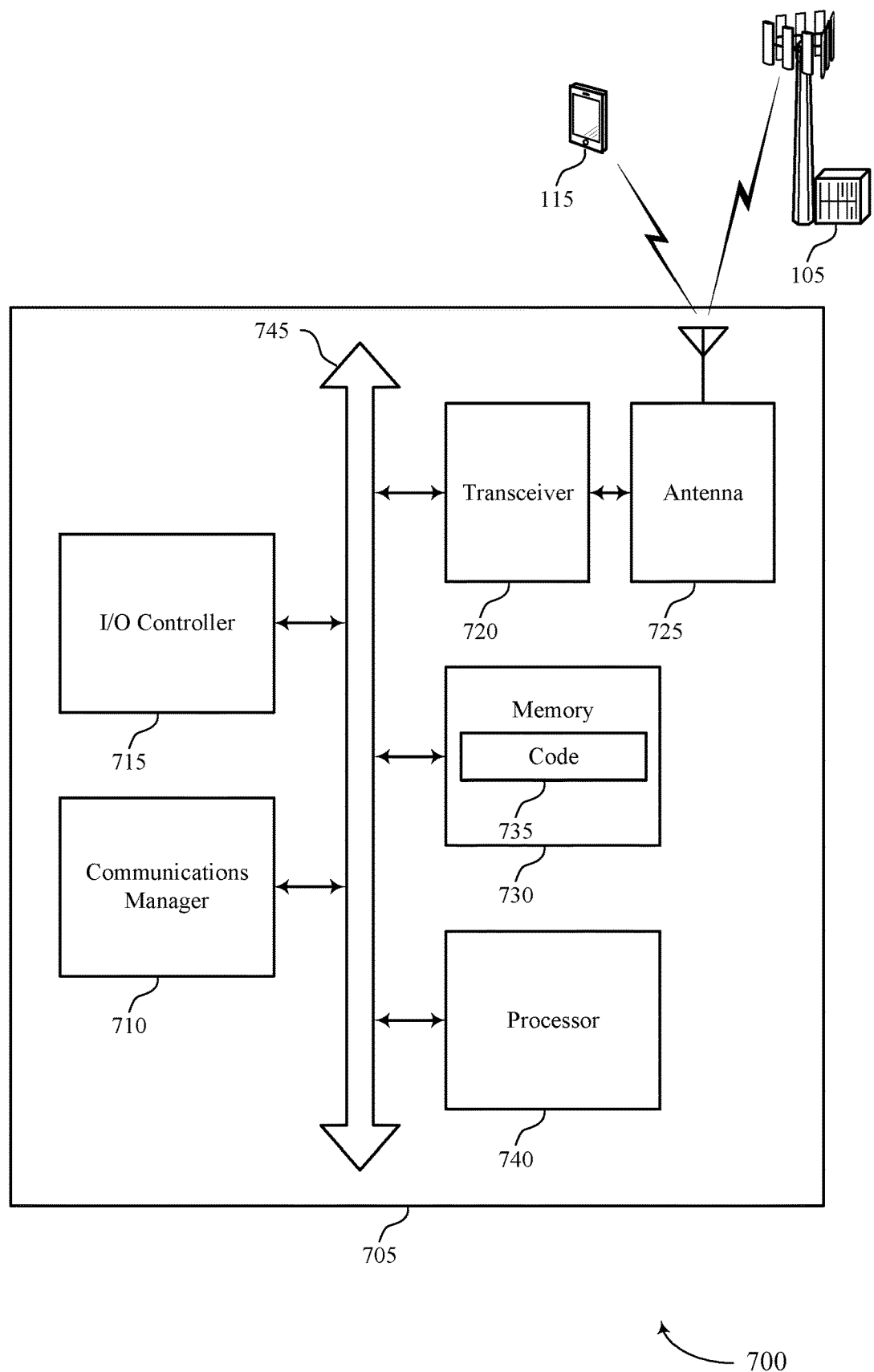
FIG. 7 shows a diagram of a system including a device that supports IBE of a message associated with a connection procedure in accordance with aspects of the present disclosure.

FIG. 7 shows a diagram of a system 700 including a device 705 that supports IBE of a message associated with a connection procedure in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may receive a system parameter identified by a network entity, receive a cell identifier during a connection procedure between the device 705 and a base station in wireless communication with the device 705, where the cell identifier is associated with the base station, encrypt at least a portion of a message associated with the connection procedure, where encryption of the message is based on the cell identifier and the system parameter, and transmit the message to the base station.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described herein. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas. In some cases, the device 705 may include a single antenna 725. However, in some cases the device 705 may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic input basic output (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting IBE of a message associated with a connection procedure).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
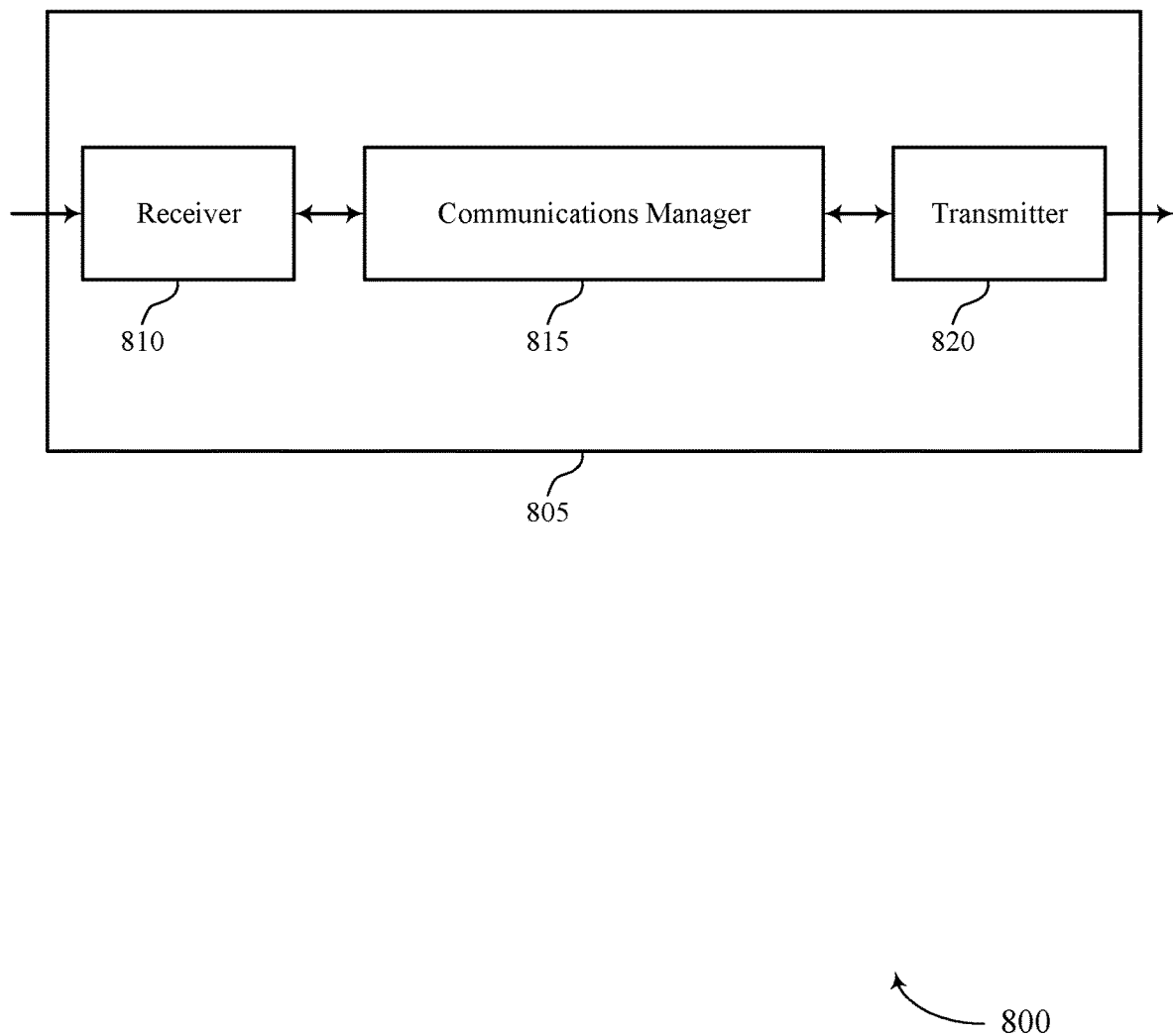
FIGS. 8 and 9 show block diagrams of devices that support IBE of a message associated with a connection procedure in accordance with aspects of the present disclosure.

FIG. 8 shows a block diagram 800 of a device 805 that supports IBE of a message associated with a connection procedure in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to IBE of a message associated with a connection procedure, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive a message from a UE, where at least a portion of the message (e.g., the message associated with the connection procedure is an RRC setup complete message, as illustrated at 355 and described with reference to FIG. 3) is encrypted via encryption based on a cell identifier and a system parameter identified by a network entity and decrypt at least the portion of the message based on a security key associated with the cell identifier. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver component. For example, the transmitter 820 may be an example of aspects of the transceiver 1120 described with reference to FIG. 11. The transmitter 820 may utilize a single antenna or a set of antennas.

Figure 9:
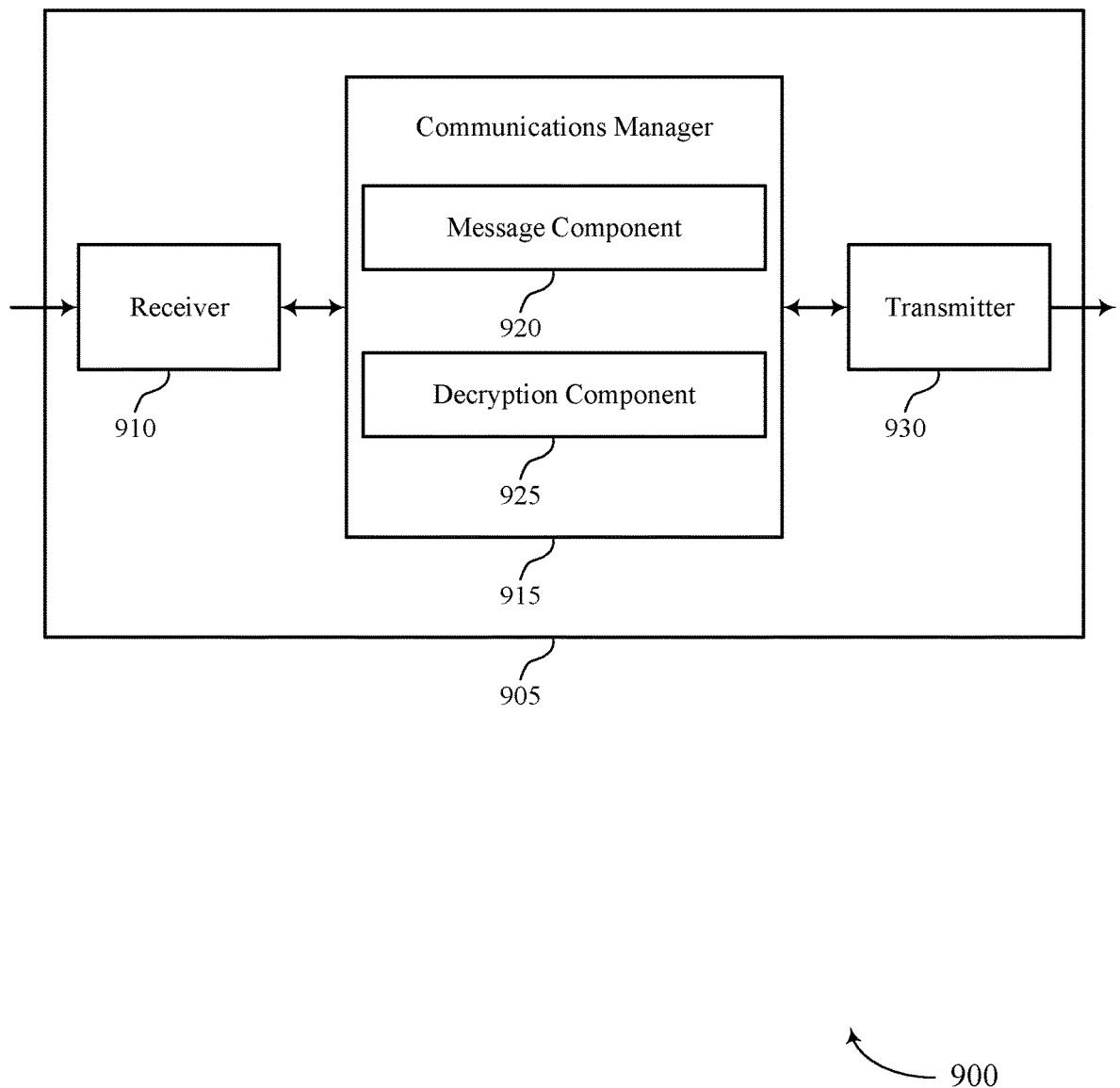

FIG. 9 shows a block diagram 900 of a device 905 that supports IBE of a message associated with a connection procedure in accordance with aspects of the present disclosure. The device 905 may be an example of aspects of a device 805, or a base station 105 as described herein. The device 905 may include a receiver 910, a communications manager 915, and a transmitter 930. The device 905 may also include a processor. Each of these components may be in communication with one another (e.g., via one or more buses).

The receiver 910 may receive information such as packets, user data, or control information associated with various information channels (e.g., control channels, data channels, and information related to IBE of a message associated with a connection procedure, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a message component 920 and a decryption component 925. The communications manager 915 may be an example of aspects of the communications manager 1110 described herein. The message component 920 may receive a message from a UE, where at least a portion of the message is encrypted via encryption based on a cell identifier and a system parameter identified by a network entity. The decryption component 925 may decrypt at least the portion of the message based on a security key associated with the cell identifier.

The transmitter 930 may transmit signals generated by other components of the device 905. In some examples, the transmitter 930 may be collocated with a receiver 910 in a transceiver component. For example, the transmitter 930 may be an example of aspects of the transceiver 1120 described with reference to FIG. 11. The transmitter 930 may utilize a single antenna or a set of antennas.

Figure 10:
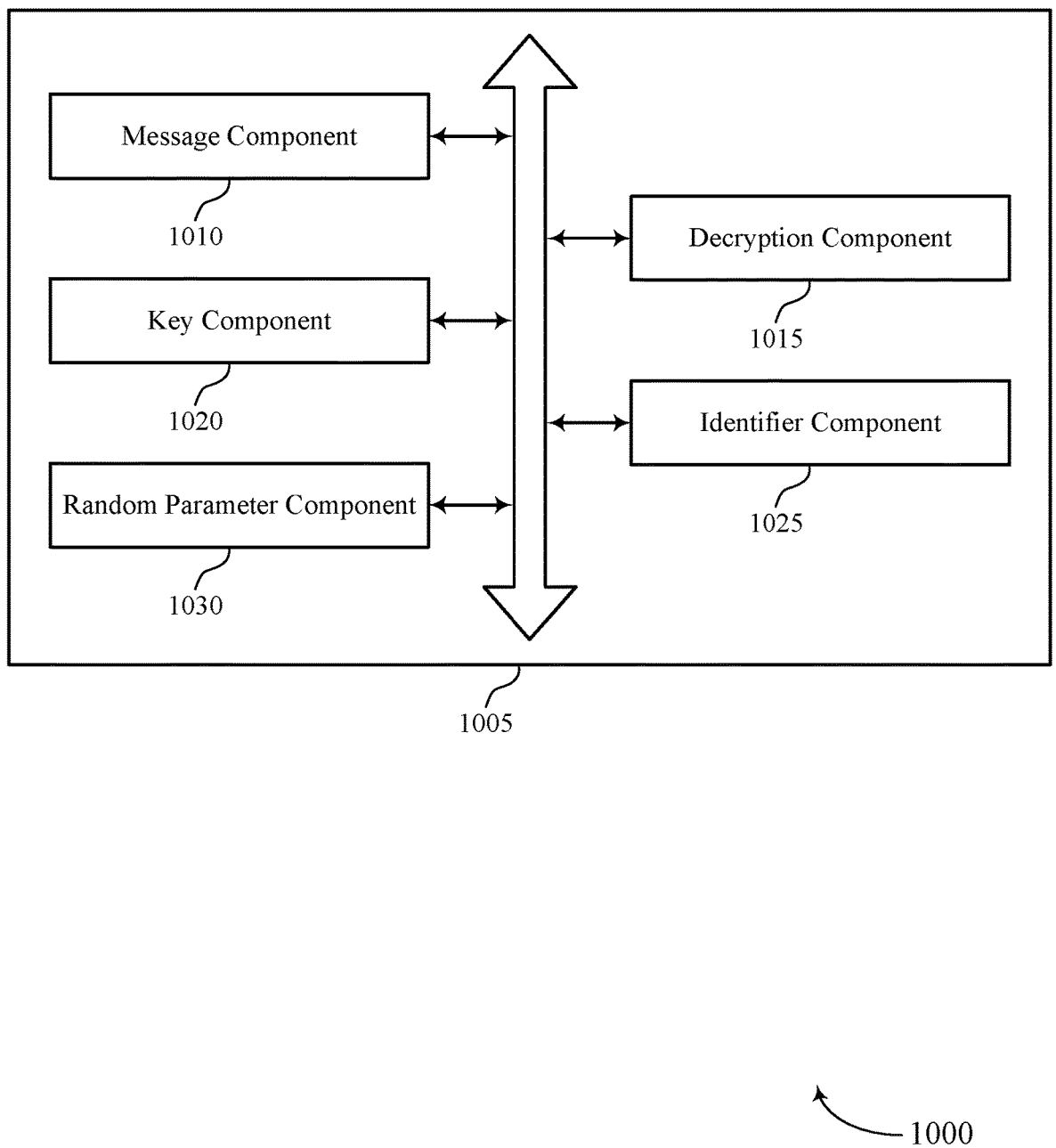
FIG. 10 shows a block diagram of a communications manager that supports IBE of a message associated with a connection procedure in accordance with aspects of the present disclosure.

FIG. 10 shows a block diagram 1000 of a communications manager 1005 that supports IBE of a message associated with a connection procedure in accordance with aspects of the present disclosure. The communications manager 1005 may be an example of aspects of a communications manager 815, a communications manager 915, or a communications manager 1110 described herein. The communications manager 1005 may include a message component 1010, a decryption component 1015, a key component 1020, an identifier component 1025, and a random parameter component 1030. Each of these components may communicate, directly or indirectly, with one another (e.g., via one or more buses).

The message component 1010 may receive a message (e.g., the message associated with the connection procedure is an RRC setup complete message, as illustrated at 355 and described with reference to FIG. 3) from a UE, where at least a portion of the message is encrypted via encryption based on a cell identifier and a system parameter identified by a network entity. The decryption component 1015 may decrypt at least the portion of the message based on a security key associated with the cell identifier. In some examples, the decryption component 1015 may decrypt one or more S-NSSAI values or a list of S-NSSAI values from the message. In some examples, the decryption component 1015 may select an AMF based on the one or more S-NSSAI values or the list of S-NSSAI values. The key component 1020 may receive the security key from the public key generator. In some examples, the key component 1020 may receive a set of security keys, each of the security keys being associated with the cell identifier associated with the base station.

The identifier component 1025 may transmit a system information block during a connection procedure with the UE, the system information block including the cell identifier. In some examples, the identifier component 1025 may transmit a global unique temporary identifier to the UE based on a successful activation of non-access stratum security, where encrypting at least the portion of the connection complete message further includes encrypting the information element in the message using the global unique temporary identifier. In some examples, the identifier component 1025 may transmit the global unique temporary identifier in a registration accept message based on receiving an initial registration request message or a mobility registration update message from the UE. In some examples, the identifier component 1025 may transmit the global unique temporary identifier in a registration accept message based on receiving a periodic registration update message from the UE. In some examples, the identifier component 1025 may transmit the global unique temporary identifier using a UE configuration update procedure based on receiving a network triggered service request message from the UE. The random parameter component 1030 may identify in the at least the portion of the message a random parameter, where decrypting the message is further based on the random parameter.

Figure 11:
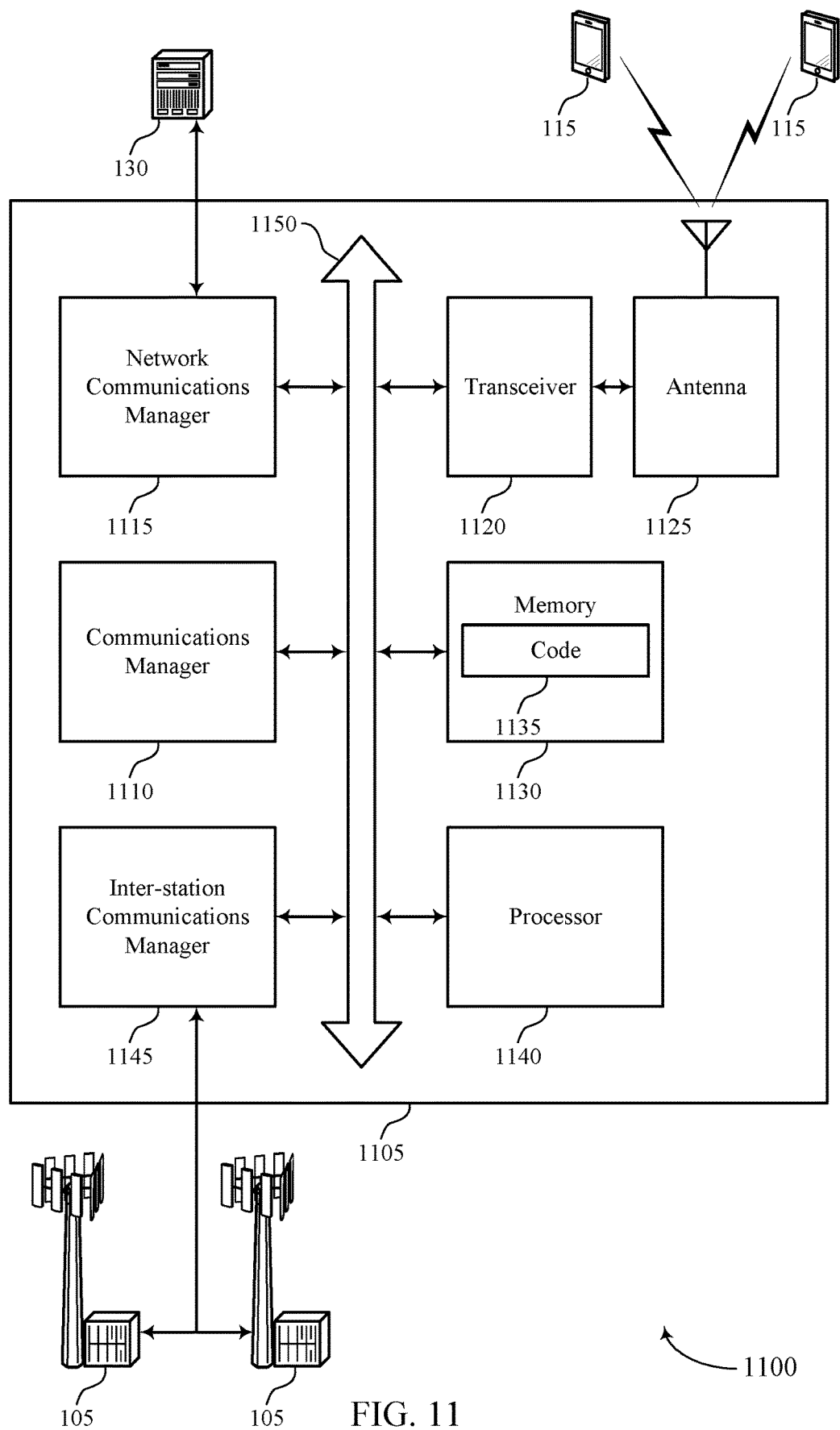
FIG. 11 shows a diagram of a system including a device that supports IBE of a message associated with a connection procedure in accordance with aspects of the present disclosure.

FIG. 11 shows a diagram of a system 1100 including a device 1105 that supports IBE of a message associated with a connection procedure in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may receive a message (e.g., the message associated with the connection procedure is an RRC setup complete message, as illustrated at 355 and described with reference to FIG. 3) from a UE in wireless communication with the device 1105, where at least a portion of the message is encrypted via encryption based on a cell identifier associated with the device 1105 and a system parameter identified by a network entity and decrypt at least the portion of the message based on a security key associated with the cell identifier.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas. In some cases, the device 1105 may include a single antenna 1125. However, in some cases the device 1105 may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting IBE of a message associated with a connection procedure).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
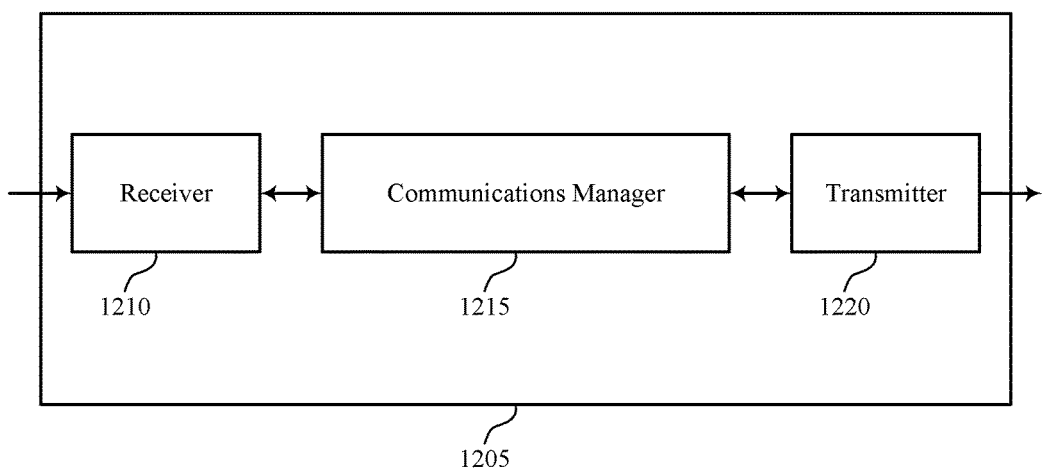
FIGS. 12 and 13 show block diagrams of devices that support IBE of a message associated with a connection procedure in accordance with aspects of the present disclosure.

FIG. 12 shows a block diagram 1200 of a device 1205 that supports IBE of a message associated with a connection procedure in accordance with aspects of the present disclosure. The device 1205 may be an example of aspects of a network entity as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to IBE of a message associated with a connection procedure, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may receive a system parameter identified by a network entity and transmit, in a message the system parameter, to a UE in wireless communication with the device 1205, where the system parameter is used to encrypt and decrypt transmissions between the UE and a base station in wireless communications with the UE. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver component. For example, the transmitter 1220 may be an example of aspects of the transceiver 1520 described with reference to FIG. 15. The transmitter 1220 may utilize a single antenna or a set of antennas.

Figure 13:
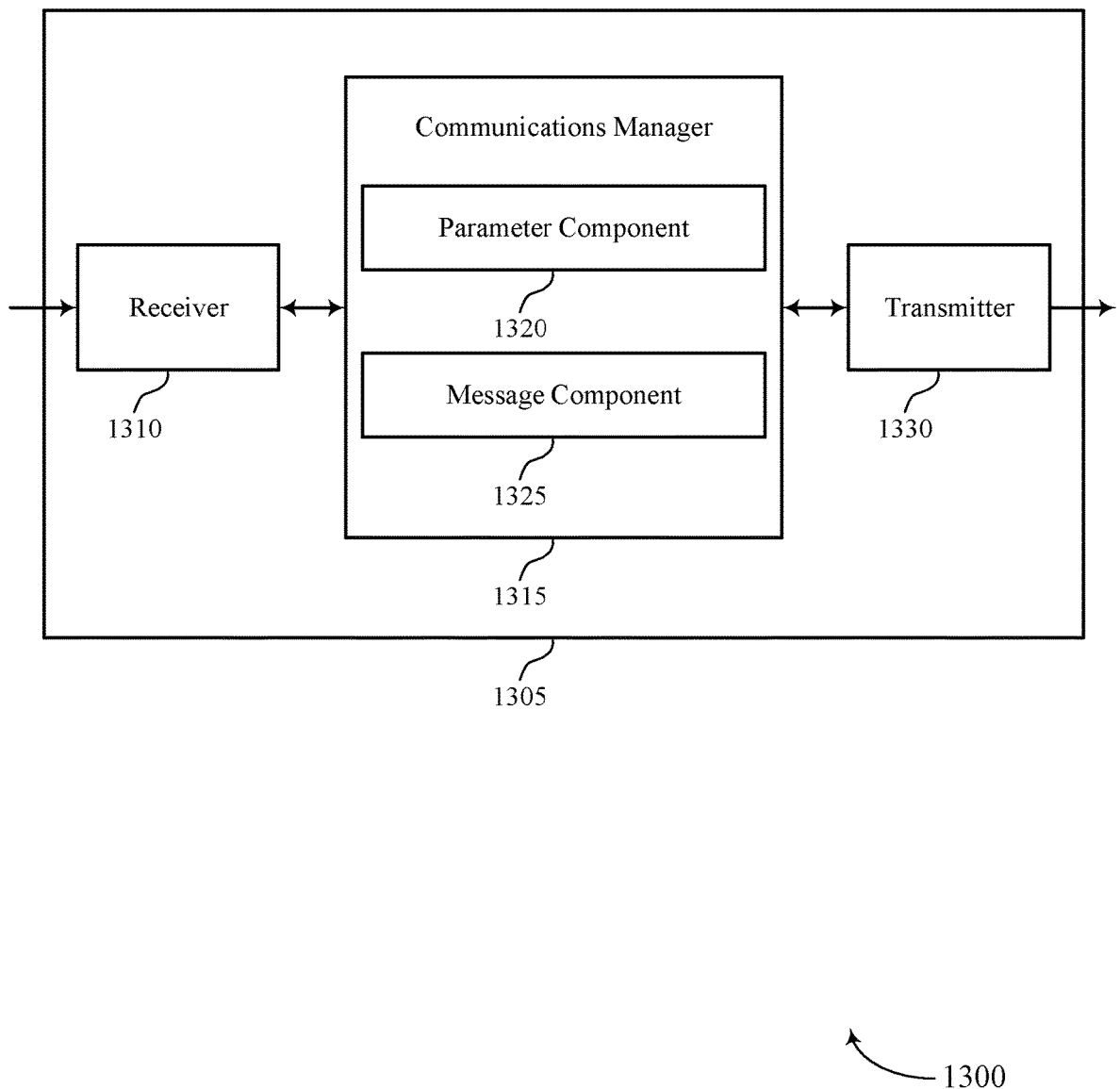

FIG. 13 shows a block diagram 1300 of a device 1305 that supports IBE of a message associated with a connection procedure in accordance with aspects of the present disclosure. The device 1305 may be an example of aspects of a device 1205 or a network entity 115 as described herein. The device 1305 may include a receiver 1310, a communications manager 1315, and a transmitter 1330. The device 1305 may also include a processor. Each of these components may be in communication with one another (e.g., via one or more buses).

The receiver 1310 may receive information such as packets, user data, or control information associated with various information channels (e.g., control channels, data channels, and information related to IBE of a message associated with a connection procedure, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a parameter component 1320 and a message component 1325. The communications manager 1315 may be an example of aspects of the communications manager 1510 described herein. The parameter component 1320 may receive a system parameter identified by a network entity. The message component 1325 may transmit, in a message the system parameter, to a UE in wireless communication with the device 1305, where the system parameter is used to encrypt and decrypt transmissions between the UE and a base station in wireless communications with the UE.

The transmitter 1330 may transmit signals generated by other components of the device 1305. In some examples, the transmitter 1330 may be collocated with a receiver 1310 in a transceiver component. For example, the transmitter 1330 may be an example of aspects of the transceiver 1520 described with reference to FIG. 15. The transmitter 1330 may utilize a single antenna or a set of antennas.

Figure 14:
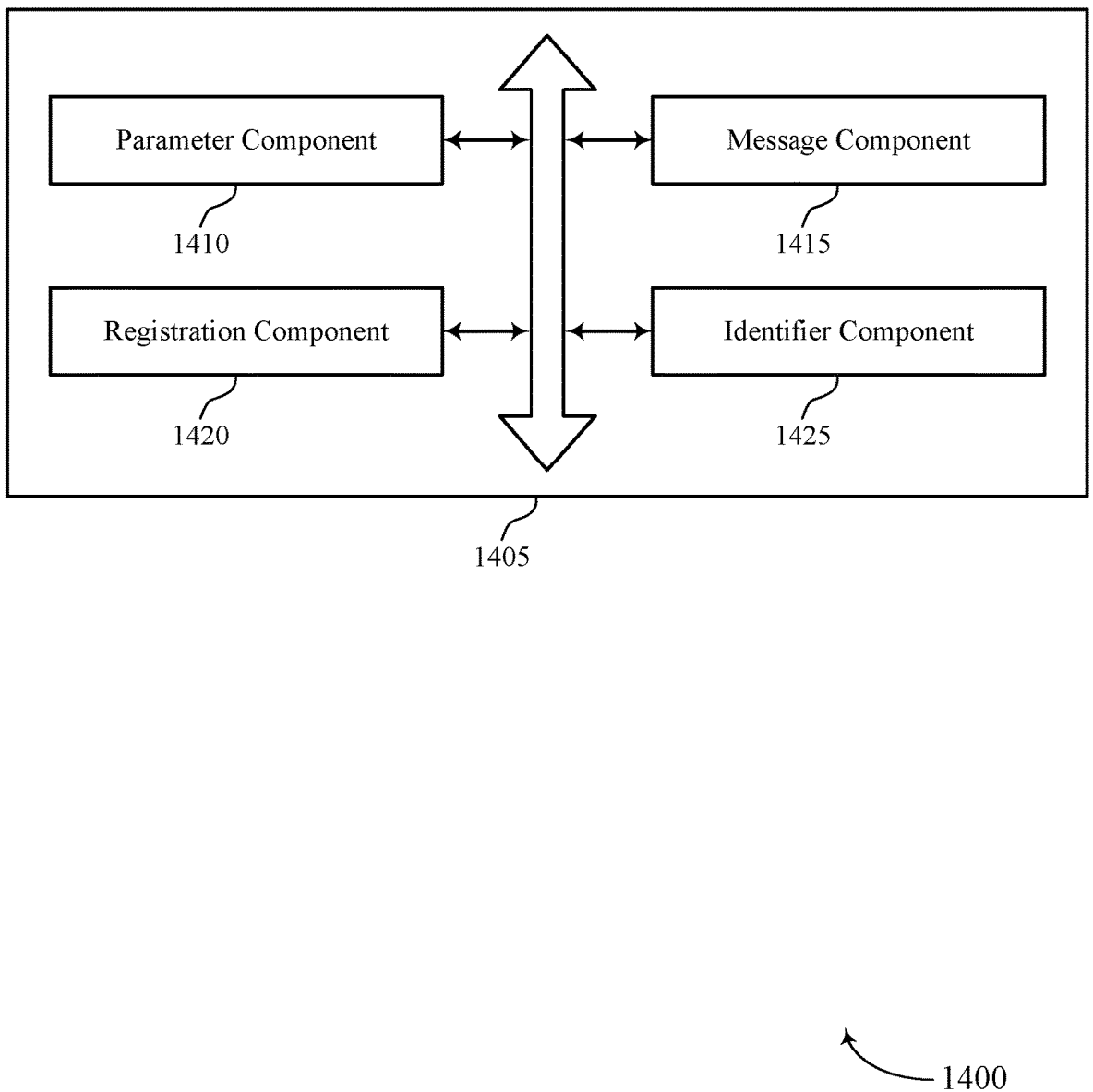
FIG. 14 shows a block diagram of a communications manager that supports IBE of a message associated with a connection procedure in accordance with aspects of the present disclosure.

FIG. 14 shows a block diagram 1400 of a communications manager 1405 that supports IBE of a message associated with a connection procedure in accordance with aspects of the present disclosure. The communications manager 1405 may be an example of aspects of a communications manager 1215, a communications manager 1315, or a communications manager 1510 described herein. The communications manager 1405 may include a parameter component 1410, a message component 1415, a registration component 1420, and an identifier component 1425. Each of these components may communicate, directly or indirectly, with one another (e.g., via one or more buses).

The parameter component 1410 may receive a system parameter identified by a network entity. The message component 1415 may transmit, in a message the system parameter, to a UE, where the system parameter is used to encrypt and decrypt transmissions between the UE and a base station in wireless communications with the UE. The registration component 1420 may receive a registration request message from the UE, where the registration request message includes UE capability. In some examples, registration component 1420 may transmit a non-access stratum message to the UE based on performing an authentication procedure with the UE in response to the registration request message, where the non-accesses stratum message includes the system parameter.

The identifier component 1425 may transmit a global unique temporary identifier to the UE based on a successful activation of non-access stratum security. In some examples, the identifier component 1425 may transmit the global unique temporary identifier in a registration accept message based on receiving an initial registration request message or a mobility registration update message from the UE. In some examples, the identifier component 1425 may transmit the global unique temporary identifier in a registration accept message based on receiving a periodic registration update message from the UE. In some examples, the identifier component 1425 may transmit the global unique temporary identifier using a UE configuration update procedure based on receiving a network triggered service request message from the UE.

Figure 15:
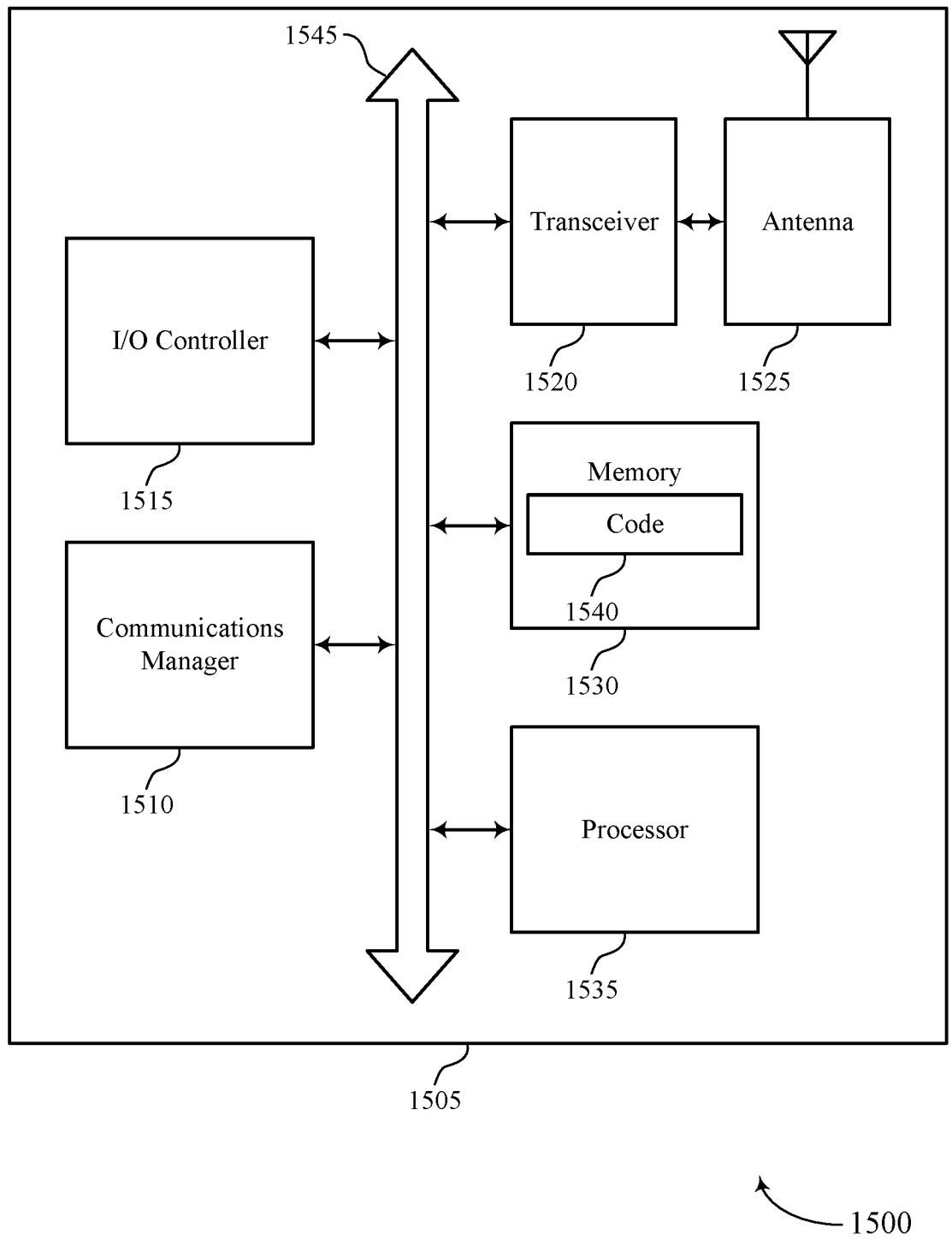
FIG. 15 shows a diagram of a system including a device that supports IBE of a message associated with a connection procedure in accordance with aspects of the present disclosure.

FIG. 15 shows a diagram of a system 1500 including a device 1505 that supports IBE of a message associated with a connection procedure in accordance with aspects of the present disclosure. The device 1505 may be an example of or include the components of device 1205, device 1305, or a network entity as described herein. For example, the device 1505 may be an AMF, a SEAF, or a combination of network functions. The device 1505 may include components for bi-directional voice and data communications including components for transmitting and receiving communications, including a communications manager 1510, an I/O controller 1515, a transceiver 1520, an antenna 1525, memory 1530, and a processor 1535. These components may be in electronic communication via one or more buses (e.g., bus 1545).

The communications manager 1510 may receive a system parameter identified by a network entity (e.g., a PKG) and transmit, in a message the system parameter, to a UE in wireless communication with the device 1505, where the system parameter is used to encrypt and decrypt transmissions between the UE and a base station in wireless communications with the UE.

The I/O controller 1515 may manage input and output signals for the device 1505. The I/O controller 1515 may also manage peripherals not integrated into the device 1505. In some cases, the I/O controller 1515 may represent a physical connection or port to an external peripheral. In some cases, the I/O controller 1515 may utilize an operating system such as iOS®, ANDROID®, MS-DOS®, MS-WINDOWS®, OS/2®, UNIX®, LINUX®, or another known operating system. In other cases, the I/O controller 1515 may represent or interact with a modem, a keyboard, a mouse, a touchscreen, or a similar device. In some cases, the I/O controller 1515 may be implemented as part of a processor. In some cases, a user may interact with the device 1505 via the I/O controller 1515 or via hardware components controlled by the I/O controller 1515.

The transceiver 1520 may communicate bi-directionally, via one or more antennas, wired, or wireless links as described herein. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas. In some cases, the device 1505 may include a single antenna 1525. However, in some cases the device 1505 may have more than one antenna 1525, which may be capable of concurrently transmitting or receiving multiple wireless transmissions.

The memory 1530 may include RAM and ROM. The memory 1530 may store computer-readable, computer-executable code 1540 including instructions that, when executed, cause the processor to perform various functions described herein. In some cases, the memory 1530 may contain, among other things, a BIOS which may control basic hardware or software operation such as the interaction with peripheral components or devices.

The processor 1535 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1535 may be configured to operate a memory array using a memory controller. In other cases, a memory controller may be integrated into the processor 1535. The processor 1535 may be configured to execute computer-readable instructions stored in a memory (e.g., the memory 1530) to cause the device 1505 to perform various functions (e.g., functions or tasks supporting IBE of a message associated with a connection procedure).

The code 1540 may include instructions to implement aspects of the present disclosure, including instructions to support wireless communications. The code 1540 may be stored in a non-transitory computer-readable medium such as system memory or other type of memory. In some cases, the code 1540 may not be directly executable by the processor 1535 but may cause a computer (e.g., when compiled and executed) to perform functions described herein.

Figure 16:
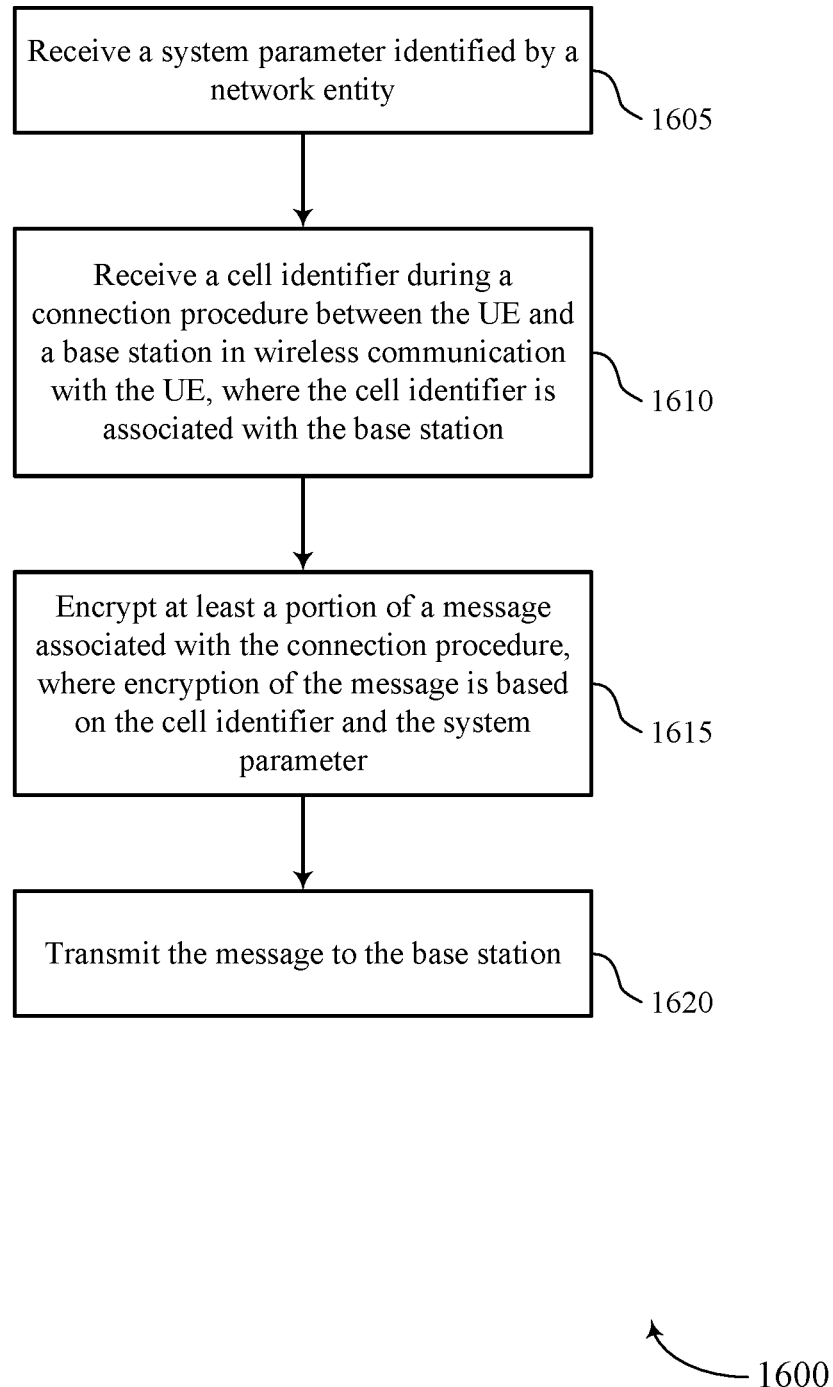
FIGS. 16 through 20 show flowcharts illustrating methods that support IBE of a message associated with a connection procedure in accordance with aspects of the present disclosure.

FIG. 16 shows a flowchart illustrating a method 1600 that supports IBE of a message associated with a connection procedure in accordance with aspects of the present disclosure. The operations of method 1600 may be implemented by a UE 115 or its components as described herein. For example, the operations of method 1600 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1605, the UE may receive a system parameter identified by a network entity. The operations of 1605 may be performed according to the methods described herein. In some examples, aspects of the operations of 1605 may be performed by a parameter component as described with reference to FIGS. 4 through 7.

At 1610, the UE may receive a cell identifier during a connection procedure between the UE and a base station in wireless communication with the UE, where the cell identifier is associated with the base station. The operations of 1610 may be performed according to the methods described herein. In some examples, aspects of the operations of 1610 may be performed by an identifier component as described with reference to FIGS. 4 through 7.

At 1615, the UE may encrypt at least a portion of a message associated with the connection procedure, where encryption of the message is based on the cell identifier and the system parameter. The operations of 1615 may be performed according to the methods described herein. In some examples, aspects of the operations of 1615 may be performed by an encryption component as described with reference to FIGS. 4 through 7.

At 1620, the UE may transmit the message (e.g., the message associated with the connection procedure is an RRC setup complete message, as illustrated at 355 and described with reference to FIG. 3) to the base station. The operations of 1620 may be performed according to the methods described herein. In some examples, aspects of the operations of 1620 may be performed by an encryption component as described with reference to FIGS. 4 through 7.

Figure 17:
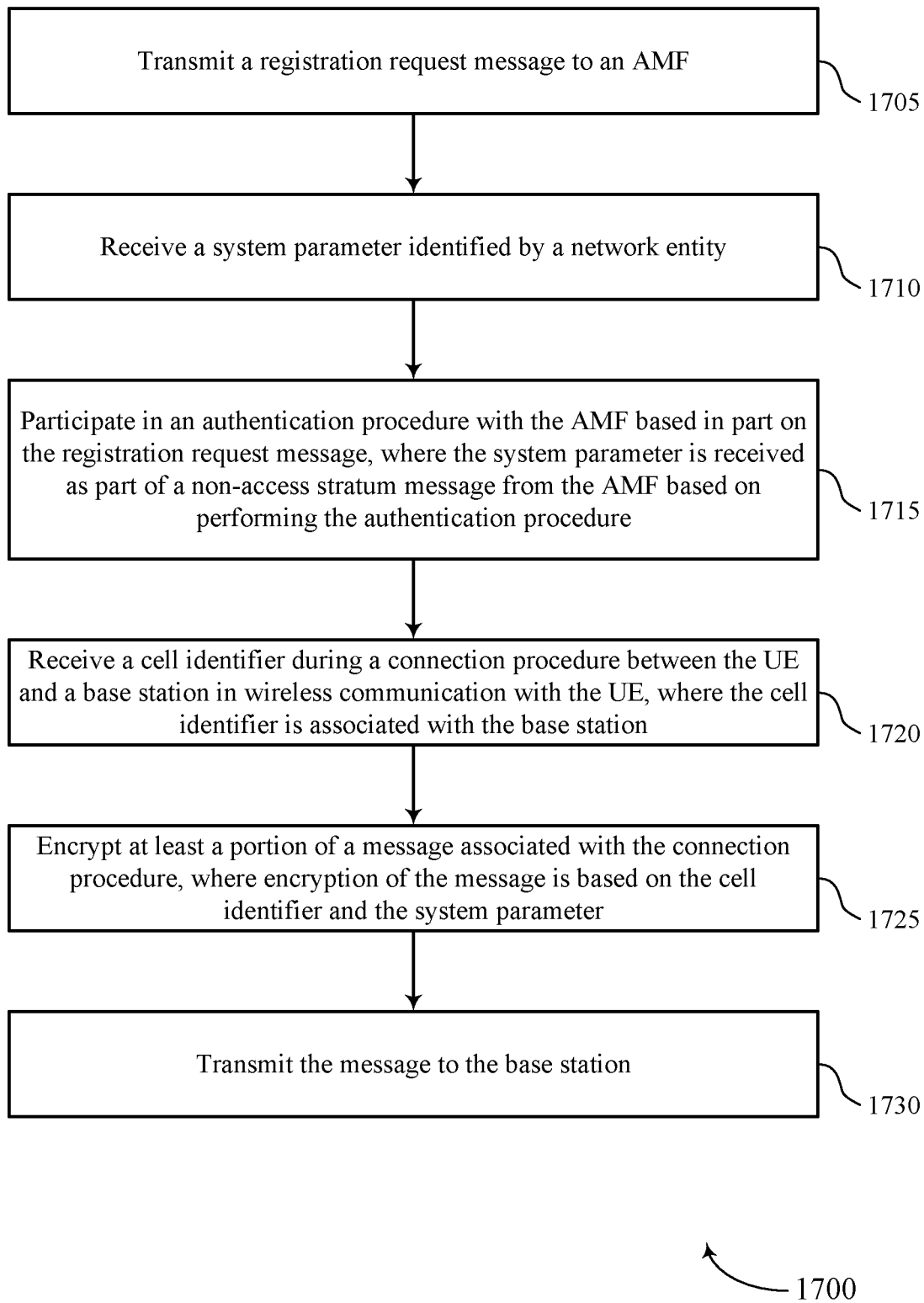

FIG. 17 shows a flowchart illustrating a method 1700 that supports IBE of a message associated with a connection procedure in accordance with aspects of the present disclosure. The operations of method 1700 may be implemented by a UE 115 or its components as described herein. For example, the operations of method 1700 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1705, the UE may transmit a registration request message to an AMF. The operations of 1705 may be performed according to the methods described herein. In some examples, aspects of the operations of 1705 may be performed by a registration component as described with reference to FIGS. 4 through 7.

At 1710, the UE may receive a system parameter identified by a network entity. For example, the UE may receive a system parameter identified by a PKG or a SEAF (where the SEAF may have PKG functionality). The operations of 1710 may be performed according to the methods described herein. In some examples, aspects of the operations of 1710 may be performed by a parameter component as described with reference to FIGS. 4 through 7.

At 1715, the UE may participate in an authentication procedure with the AMF based in part on the registration request message, where the system parameter is received as part of a non-access stratum message from the AMF based on performing the authentication procedure. The operations of 1715 may be performed according to the methods described herein. In some examples, aspects of the operations of 1715 may be performed by a registration component as described with reference to FIGS. 4 through 7.

At 1720, the UE may receive a cell identifier during a connection procedure between the UE and a base station in wireless communication with the UE, where the cell identifier is associated with the base station. The operations of 1720 may be performed according to the methods described herein. In some examples, aspects of the operations of 1720 may be performed by an identifier component as described with reference to FIGS. 4 through 7.

At 1725, the UE may encrypt at least a portion of a message associated with the connection procedure, where encryption of the message is based on the cell identifier and the system parameter. The operations of 1725 may be performed according to the methods described herein. In some examples, aspects of the operations of 1725 may be performed by an encryption component as described with reference to FIGS. 4 through 7.

At 1730, the UE may transmit the message (e.g., the message associated with the connection procedure is an RRC setup complete message, as illustrated at 355 and described with reference to FIG. 3) to the base station. The operations of 1730 may be performed according to the methods described herein. In some examples, aspects of the operations of 1730 may be performed by an encryption component as described with reference to FIGS. 4 through 7.

Figure 18:
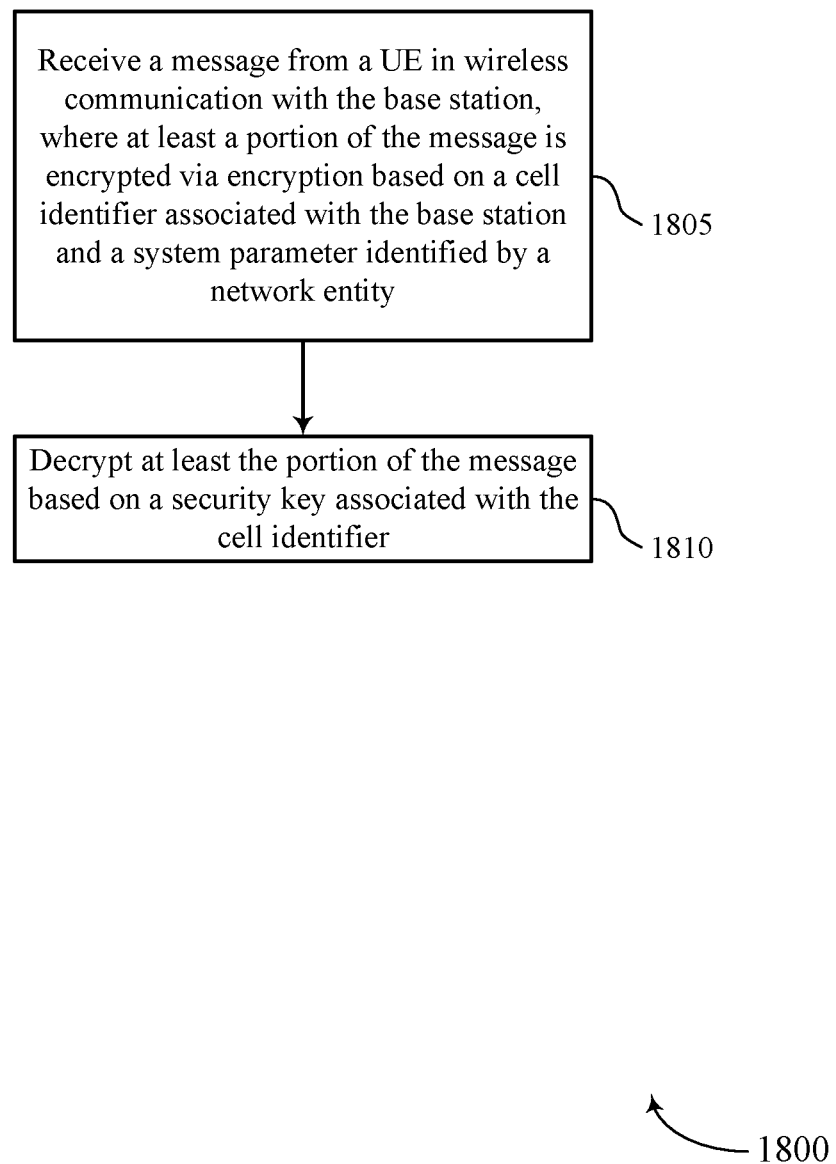

FIG. 18 shows a flowchart illustrating a method 1800 that supports IBE of a message associated with a connection procedure in accordance with aspects of the present disclosure. The operations of method 1800 may be implemented by a base station 105 or its components as described herein. For example, the operations of method 1800 may be performed by a communications manager as described with reference to FIGS. 8 through 11. In some examples, a base station may execute a set of instructions to control the functional elements of the base station to perform the functions described herein. Additionally or alternatively, a base station may perform aspects of the functions described herein using special-purpose hardware.

At 1805, the base station may receive a message (e.g., the message associated with the connection procedure is an RRC setup complete message, as illustrated at 355 and described with reference to FIG. 3) from a UE in wireless communication with the base station, where at least a portion of the message is encrypted via encryption based on a cell identifier associated with the base station and a system parameter identified by a network entity (e.g., an AMF, a SEAF, or a PKG). The operations of 1805 may be performed according to the methods described herein. In some examples, aspects of the operations of 1805 may be performed by a message component as described with reference to FIGS. 8 through 11.

At 1810, the base station may decrypt at least the portion of the message based on a security key associated with the cell identifier. The operations of 1810 may be performed according to the methods described herein. In some examples, aspects of the operations of 1810 may be performed by a decryption component as described with reference to FIGS. 8 through 11.

Figure 19:
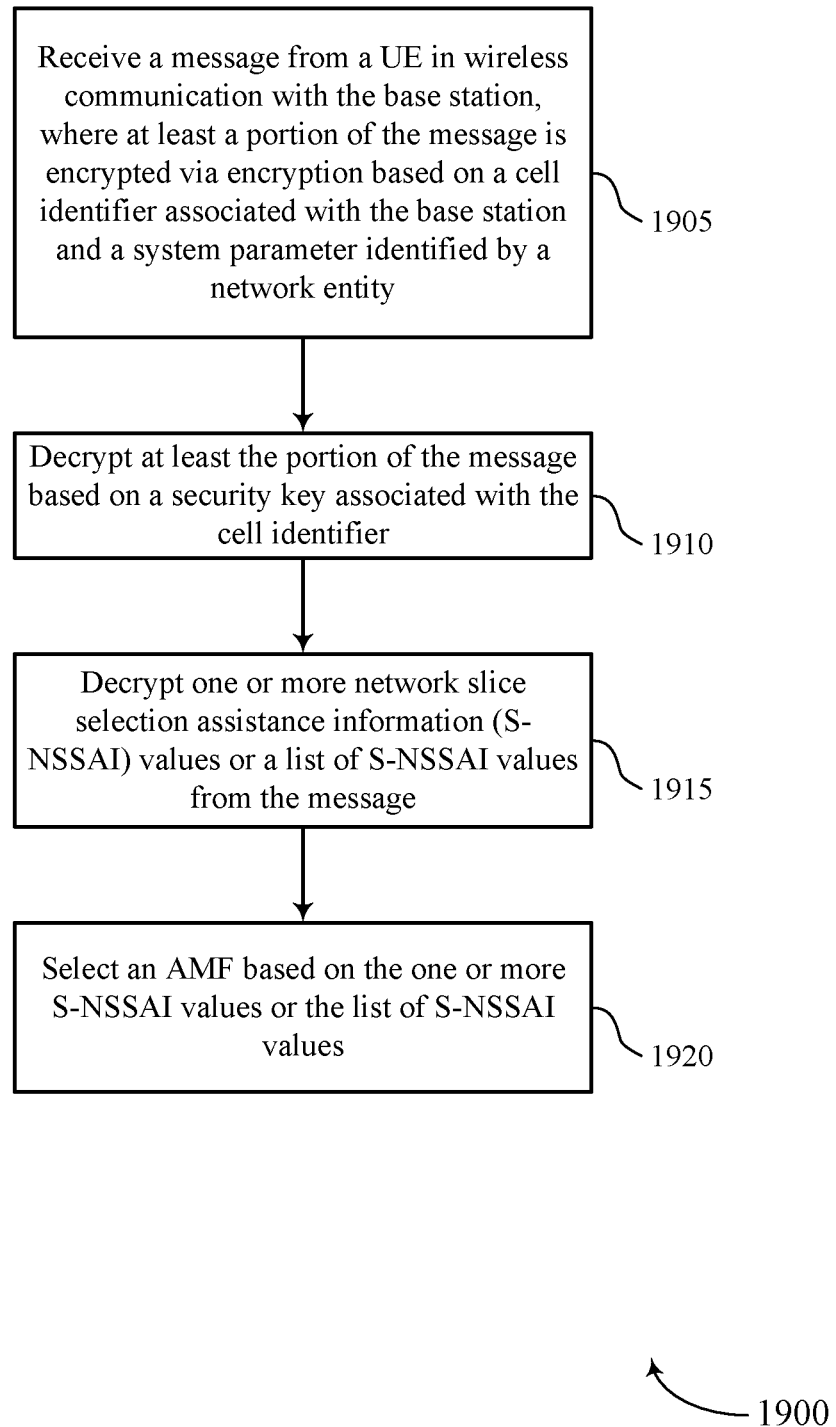

FIG. 19 shows a flowchart illustrating a method 1900 that supports IBE of a message associated with a connection procedure in accordance with aspects of the present disclosure. The operations of method 1900 may be implemented by a base station 105 or its components as described herein. For example, the operations of method 1900 may be performed by a communications manager as described with reference to FIGS. 8 through 11.

In some examples, a base station may execute a set of instructions to control the functional elements of the base station to perform the functions described herein. Additionally or alternatively, a base station may perform aspects of the functions described herein using special-purpose hardware.

At 1905, the base station may receive a message (e.g., the message associated with the connection procedure is an RRC setup complete message, as illustrated at 355 and described with reference to FIG. 3) from a UE in wireless communication with the base station, where at least a portion of the message is encrypted via encryption based on a cell identifier associated with the base station and a system parameter identified by a network entity (e.g., an AMF, a SEAF, or a PKG). The operations of 1905 may be performed according to the methods described herein. In some examples, aspects of the operations of 1905 may be performed by a message component as described with reference to FIGS. 8 through 11.

At 1910, the base station may decrypt at least the portion of the message based on a security key associated with the cell identifier. The operations of 1910 may be performed according to the methods described herein. In some examples, aspects of the operations of 1910 may be performed by a decryption component as described with reference to FIGS. 8 through 11.

At 1915, the base station may decrypt one or more S-NSSAI values or a list of S-NSSAI values from the message. The operations of 1915 may be performed according to the methods described herein. In some examples, aspects of the operations of 1915 may be performed by a decryption component as described with reference to FIGS. 8 through 11.

At 1920, the base station may select an AMF based on the one or more S-NSSAI values or the list of S-NSSAI values. The operations of 1920 may be performed according to the methods described herein. In some examples, aspects of the operations of 1920 may be performed by a decryption component as described with reference to FIGS. 8 through 11.

Figure 20:
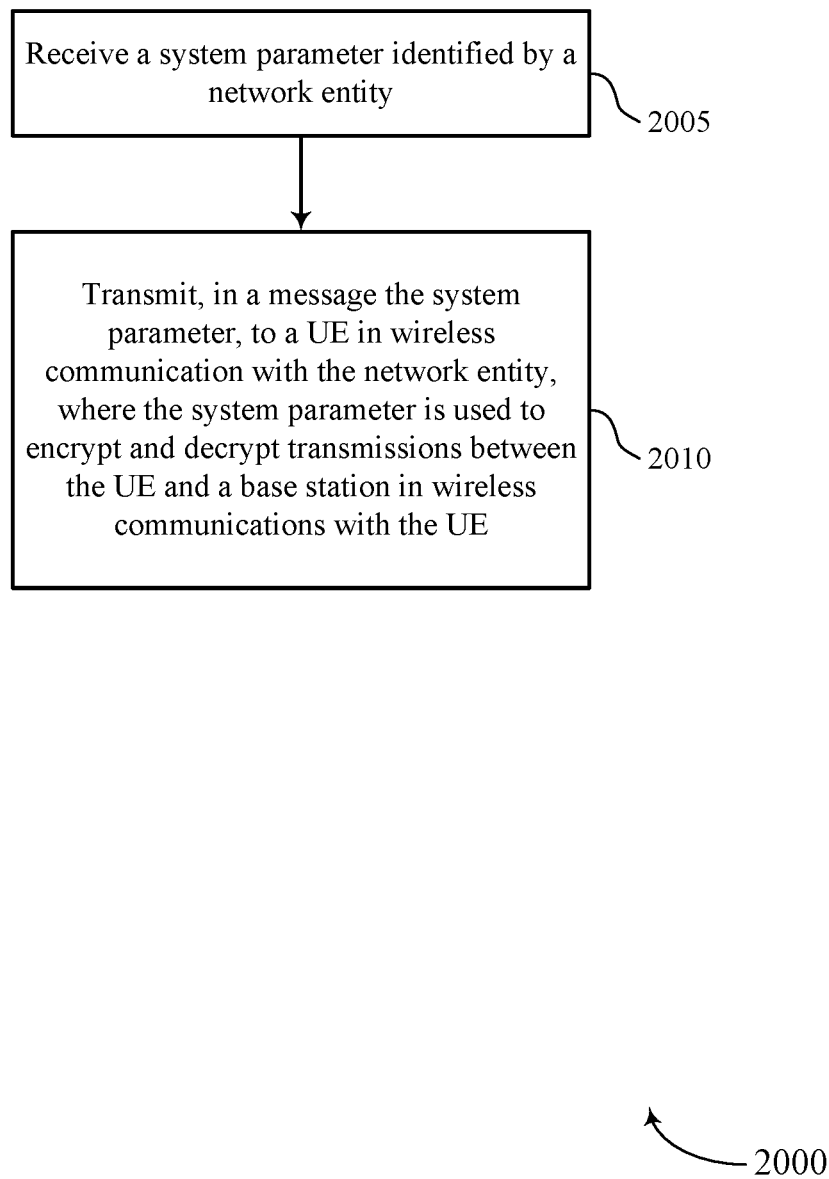

FIG. 20 shows a flowchart illustrating a method 2000 that supports IBE of a message associated with a connection procedure in accordance with aspects of the present disclosure. The operations of method 2000 may be implemented by a network entity (e.g., an AMF, a SEAF, or a PKG) or its components as described herein. For example, the operations of method 2000 may be performed by a communications manager as described with reference to FIGS. 12 through 15. In some examples, a network entity may execute a set of instructions to control the functional elements of the network entity to perform the functions described herein. Additionally or alternatively, a network entity may perform aspects of the functions described herein using special-purpose hardware.

At 2005, the network entity may receive a system parameter identified by another network entity. For example, an AMF may receive a system parameter identified by a PKG or a SEAF (where the SEAF may have PKG functionality). The operations of 2005 may be performed according to the methods described herein. In some examples, aspects of the operations of 2005 may be performed by a parameter component as described with reference to FIGS. 12 through 15.

At 2010, the network entity may transmit, in a message the system parameter, to a UE in wireless communication with the network entity, where the system parameter is used to encrypt and decrypt transmissions between the UE and a base station in wireless communications with the UE. The operations of 2010 may be performed according to the methods described herein. In some examples, aspects of the operations of 2010 may be performed by a message component as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    transmitting a registration request message to an access and mobility management function;
    participating in an authentication procedure with the access and mobility management function based in part on the registration request message, wherein a system parameter is received as part of a non-access stratum message from the access and mobility management function based at least in part on participating in the authentication procedure, the system parameter identified by a network entity;
    receiving a cell identifier during a connection procedure between the UE and an access network entity in wireless communication with the UE, wherein the cell identifier is associated with the access network entity;
    encrypting, before an access stratum (AS) security setup procedure, at least a portion of a message associated with the connection procedure, wherein encrypting at least the portion of the message is based at least in part on one or more of the cell identifier or the system parameter; and
    transmitting the message including encrypted at least the portion of the message to the access network entity.

2. The method of claim 1, wherein encrypting at least the portion of the message associated with the connection procedure comprises:
    encrypting portions of the message that includes private information.

3. The method of claim 1, wherein encrypting at least the portion of the message comprises:
    encrypting an information element in the message using the cell identifier and the system parameter, the information element comprising one or more single-network slice selection assistance information (S-NSSAI) values or a list of S-NSSAI values.

4. The method of claim 1, wherein the system parameter comprises a public parameter in identity-based cryptography.

5. The method of claim 1, further comprising:
    receiving the system parameter from the access and mobility management function as part of a registration accept message responsive to the registration request message.

6. The method of claim 1, wherein the non-access stratum message is integrity protected using a key derived based on the authentication procedure.

7. The method of claim 1, further comprising:
    identifying a temporary mobile subscriber identifier, a hash-based temporary mobile subscriber identifier, or a global unique temporary identifier, or a combination thereof, wherein encrypting at least the portion of the message further comprises encrypting an information element in the message using the temporary mobile subscriber identifier, the hash-based temporary mobile subscriber identifier, or the global unique temporary identifier, or a combination thereof.

8. The method of claim 1, further comprising:
    receiving a global unique temporary identifier based at least in part on a successful activation of non-access stratum security, wherein encrypting at least the portion of the message further comprises encrypting an information element in the message using the global unique temporary identifier.

9. The method of claim 1, further comprising:
    including in the at least the portion of the message a random parameter associated with the UE.

10. The method of claim 1, wherein receiving the cell identifier during the connection procedure comprises:
    receiving a system information block during the connection procedure, the system information block comprising the cell identifier associated with the access network entity.

11. The method of claim 1, wherein encrypting at least the portion of the message associated with the connection procedure comprises:
    encrypting portions of the message based at least in part on an identity-based encryption (IBE).

12. The method of claim 1, wherein the network entity is a public key generator (PKG) or a key management function.

13. A method for wireless communications at an access network entity, comprising:
    communicating a registration request message from a user equipment (UE) to an access and mobility management function;

communicating, after communicating the registration request message, one or more messages of an authentication procedure between the UE and the access and mobility management function, including a system parameter as part of a non-access stratum message from the access and mobility management function, the system parameter identified by a network entity;

receiving a message from a user equipment (UE) in wireless communication with the access network entity, wherein at least a portion of the message is encrypted via encryption based on a cell identifier associated with the access network entity and the system parameter; and decrypting, before an access stratum (AS) security setup procedure, at least the portion of the message based at least in part on one or more of a security key associated with the cell identifier or the system parameter.

14. The method of claim 13, wherein the security key is generated based at least in part on the cell identifier, the system parameter, or a secret key known to the network entity, or a combination thereof.

15. The method of claim 13, wherein the network entity is a public key generator.

16. The method of claim 15, wherein the public key generator is one or more of the access and mobility management function or a security anchor function (SEAF).

17. The method of claim 15, further comprising:
receiving the security key from the public key generator.

18. The method of claim 17, wherein receiving the security key comprises:
receiving a set of security keys, each security key of the set of security keys being associated with the cell identifier associated with the access network entity.

19. The method of claim 13, further comprising:
transmitting a system information block during a connection procedure with the UE in wireless communication with the access network entity, the system information block comprising the cell identifier associated with the access network entity.

20. The method of claim 13, wherein the access and mobility management function comprises a first access and mobility management function, and wherein decrypting at least the portion of the message comprises:
decrypting one or more network slice selection assistance information (S-NSSAI) values or a list of S-NSSAI values from the message; and
selecting a second access and mobility management function (AMF) based at least in part on the one or more S-NSSAI values or the list of S-NSSAI values.

21. The method of claim 20, further comprising:
identifying in the at least the portion of the message a random parameter, wherein decrypting the message is further based at least in part on the random parameter.

22. The method of claim 13, further comprising:
transmitting a global unique temporary identifier to the UE based at least in part on a successful activation of non-access stratum security, wherein decrypting at least the portion of the message further comprises decrypting an information element in the message using the global unique temporary identifier.

23. The method of claim 22, wherein transmitting the global unique temporary identifier to the UE comprises:
transmitting the global unique temporary identifier in a registration accept message based at least in part on receiving an initial registration request message or a mobility registration update message from the UE.

24. The method of claim 22, wherein transmitting the global unique temporary identifier to the UE comprises:
transmitting the global unique temporary identifier in a registration accept message based at least in part on receiving a periodic registration update message from the UE.

25. The method of claim 22, wherein transmitting the global unique temporary identifier to the UE comprises:
transmitting the global unique temporary identifier using a UE configuration update procedure based at least in part on receiving a network triggered service request message from the UE.

26. A method for wireless communications at an access and mobility management function, comprising:
receiving a system parameter identified by a network entity;
receiving a registration request message from a user equipment (UE);
participating in an authentication procedure with the UE based in part on the registration request message; and
transmitting, the system parameter as part of a non-access stratum message, to the UE in wireless communication with the access and mobility management function based at least in part on participating in the authentication procedure, wherein the system parameter is used to encrypt and decrypt transmissions between the UE and an access network entity in wireless communications with the UE before an access stratum (AS) security setup procedure.

27. An apparatus for wireless communications, comprising:
a processor,
memory in electronic communication with the processor; and
instructions stored in the memory and executable by the processor to cause the apparatus to:
transmit a registration request message to an access and mobility management function;
participate in an authentication procedure with the access and mobility management function based in part on the registration request message, wherein a system parameter is received as part of a non-access stratum message from the access and mobility management function based at least in part on participating in the authentication procedure, the system parameter identified by a network entity;
receive a cell identifier during a connection procedure between the apparatus and an access network entity in wireless communication with the apparatus, wherein the cell identifier is associated with the access network entity;
encrypt, before an access stratum (AS) security setup procedure, at least a portion of a message associated with the connection procedure, wherein encrypting at least the portion of the message is based at least in part on one or more of the cell identifier or the system parameter; and
transmit the message including encrypted at least the portion of the message to the access network entity.

* * * * *